United States Patent
Aono et al.

(10) Patent No.: US 12,496,813 B2
(45) Date of Patent: Dec. 16, 2025

(54) POLYPROPYLENE FILM, LAMINATE, PACKAGING MATERIAL, AND PACKING BODY

(71) Applicant: Toray Industries, Inc., Tokyo (JP)

(72) Inventors: Haruki Aono, Otsu (JP); Yasuyuki Imanishi, Otsu (JP); Masatoshi Ohkura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 190 days.

(21) Appl. No.: 18/280,515

(22) PCT Filed: Mar. 28, 2022

(86) PCT No.: PCT/JP2022/014885
§ 371 (c)(1),
(2) Date: Sep. 6, 2023

(87) PCT Pub. No.: WO2022/210493
PCT Pub. Date: Oct. 6, 2022

(65) Prior Publication Data
US 2024/0123717 A1 Apr. 18, 2024

(30) Foreign Application Priority Data
Mar. 31, 2021 (JP) .................. 2021-059753

(51) Int. Cl.
*B32B 27/08* (2006.01)
*B32B 27/32* (2006.01)

(52) U.S. Cl.
CPC .............. *B32B 27/08* (2013.01); *B32B 27/32* (2013.01); *B32B 2250/03* (2013.01); *B32B 2250/242* (2013.01); *B32B 2250/40* (2013.01); *B32B 2307/31* (2013.01); *B32B 2307/736* (2013.01); *B32B 2553/00* (2013.01)

(58) Field of Classification Search
CPC ..... B32B 27/08; B32B 27/32; B32B 2250/03; B32B 2250/242; B32B 2250/40; B32B 2307/31; B32B 2307/736; B32B 2553/00; B32B 15/085; B32B 15/20; B32B 27/16; B32B 2255/10; B32B 2255/20; B32B 2255/205; B32B 2270/00; B32B 2307/30; B32B 2307/308; B32B 2307/412; B32B 2307/518; B32B 2307/538; B32B 2307/581; B32B 2307/7244; B32B 2307/7246; B32B 2439/46; B32B 2439/70; B32B 2439/80; C08J 2323/12; C08J 5/18; Y02W 30/80
See application file for complete search history.

(56) References Cited

U.S. PATENT DOCUMENTS

| | | |
|---|---|---|
| 2022/0064388 A1 | 3/2022 | Yamada et al. |
| 2022/0073690 A1 | 3/2022 | Yamada et al. |

FOREIGN PATENT DOCUMENTS

| | | | | |
|---|---|---|---|---|
| JP | 0516225 | A | 1/1993 | |
| JP | 08294962 | A | 11/1996 | |
| JP | 11192680 | A | 7/1999 | |
| JP | 2001181410 | A | 7/2001 | |
| JP | 2009051134 | A | 3/2009 | |
| JP | 2009088492 | A | 4/2009 | |
| JP | 2016033211 | A | 3/2016 | |
| JP | 2018130958 | A | 8/2018 | |
| JP | 2019172921 | A | 10/2019 | |
| JP | 2020041120 | A | 3/2020 | |
| WO | 2015072291 | A1 | 5/2015 | |
| WO | WO-2019172390 | A1 * | 9/2019 | .............. H01G 4/32 |
| WO | 2020137789 | A1 | 7/2020 | |
| WO | 2020137792 | A1 | 7/2020 | |

OTHER PUBLICATIONS

Panzer, J., "Components of Solid Surface Free Energy from Wetting Measurements", Journal of Colloid and Interface Science, Jul. 1973, vol. 44(1), pp. 142-161.
International Search Report and Written Opinion for International Application No. PCT/JP2022/014885 mailed May 31, 2022, 7 pages.

* cited by examiner

Primary Examiner — Blaine Copenheaver
(74) Attorney, Agent, or Firm — Buchanan Ingersoll & Rooney PC

(57) ABSTRACT

This polypropylene film has a polypropylene-based resin as a main component, and is configured such that the value (strength X) obtained by multiplying the film thickness by the F5 value in a direction perpendicular to the principal orientation axis is 400 N/m or more and 2000 N/m or less. As measured by thermomechanical analysis (TMA), when: the thermal shrinkage (%) at 100° C. in a direction perpendicular to the principal orientation axis is SMD, 100° C.; the thermal shrinkage at 130° C. in a direction perpendicular to the principal orientation axis is SMD, 130° C.; the thermal shrinkage at 100° C. in the principal orientation axis direction is STD, 100° C.; and the thermal shrinkage at 130° C. in the principal orientation axis direction is STD, 130° C., the propropylene film satisfies |SMD, 100° C.−SMD, 130° C.|≤2.00 and |STD, 100° C.−STD, 130° C.|≤2.50.

19 Claims, No Drawings

POLYPROPYLENE FILM, LAMINATE, PACKAGING MATERIAL, AND PACKING BODY

CROSS REFERENCE TO RELATED APPLICATIONS

This is the U.S. National Phase application of PCT/JP2022/014885, filed Mar. 28, 2022, which claim priority to Japanese Patent Application No. 2021-059753, filed Mar. 31, 2021, the disclosures of each of these applications being incorporated herein by reference in their entireties for all purposes.

FIELD OF THE INVENTION

The present invention particularly relates to a polypropylene film, a laminate, a packaging material, and a packing body suitably used in packaging applications.

BACKGROUND OF THE INVENTION

Since polypropylene films are excellent in transparency, mechanical characteristics, electrical characteristics, and the like, polypropylene films have been used in various applications such as packaging applications, tape applications, and electrical insulation applications including cable wrapping and capacitors. Among them, in the packaging applications, laminated films in which a thin film of aluminum (hereinafter, it may be referred to as "Al".) is vapor-deposited on a polypropylene film are widely used. However, since films obtained by Al vapor deposition become opaque, the films are not suitable for applications requiring visibility of contents. In addition, in recent years, a trend of recycling packaging plastics has been growing, but there is a problem in that the films including an Al vapor-deposited layer have insufficient recyclability.

From the above circumstances, there is a trend to replace the conventional Al vapor-deposited layer with a transparent vapor-deposited layer of aluminum oxide (hereinafter, it may be referred to as AlOx.), silicon oxide, or the like. In a case where such a transparent vapor-deposited layer is used, the transparency and recyclability of packaging materials can be improved. However, since the transparent vapor-deposited layer is typically thinner and brittler than the Al vapor-deposited layer, there is a problem in that defects such as pinholes and cracks are generated in the vapor-deposited layer during formation of the vapor-deposited layer or in a post-process such as bag-forming processing, and the water vapor barrier property and the oxygen barrier property are easily deteriorated. In addition, in a case where the polypropylene film is applied to food packaging applications, heat sterilization treatment (boil, semi-retort, retort, etc.) may be performed. Since the polypropylene film typically has poorer thermal dimensional stability than a polyester film or the like, there is a problem in that the film is deformed by heat during heat sterilization treatment, and defects such as pinholes and cracks in the vapor-deposited layer are generated, resulting in a deterioration of the water vapor barrier property and the oxygen barrier property.

On the other hand, as the polypropylene film suitable for packaging applications, a conventional polypropylene film in which a polypropylene-based resin having low crystallinity and low stereoregularity is disposed on a surface layer has been used in order to ensure adhesion between the polypropylene film and the vapor-deposited layer (e.g., Patent Documents 1 and 2). Patent Document 1 discloses a film having a configuration in which a surface layer of a polypropylene-based resin having low stereoregularity is laminated on at least one surface of a base layer in which one or more kinds of petroleum resins and/or terpene resins are mixed with a polypropylene-based resin having high stereoregularity. In addition, Patent Document 2 discloses a film having a configuration in which a seal layer mainly containing a polyolefin-based resin is laminated on both front and back surfaces of a base layer mainly containing a polypropylene-based resin.

PATENT DOCUMENTS

Patent Document 1: Japanese Patent Laid-open Publication No. 11-192680
Patent Literature 2: Japanese Patent Laid-open Publication No. 2009-051134

SUMMARY OF THE INVENTION

However, since the polypropylene film described in Patent Document 1 uses the polypropylene-based resin having low crystallinity/low stereoregularity for the surface layer, the surface layer has insufficient thermal stability. Therefore, particularly when the transparent vapor-deposited layer is laminated for packaging applications, there is a problem in that defects such as pinholes and cracks are easily generated in the vapor-deposited layer due to thermal fluctuation of the surface layer caused by heat applied during vapor deposition, and the water vapor barrier property and the oxygen barrier property do not have sufficient values. In addition, since the polypropylene film has a high thermal shrinkage percentage, there is also a problem in that cracks are generated in the vapor-deposited layer by the polypropylene film greatly shrinking by the heat applied during vapor deposition, the water vapor barrier property and the oxygen barrier property do not have sufficient values, and the water vapor barrier property and the oxygen barrier property are further deteriorated after heat sterilization treatment. In addition, in the polypropylene film described in Patent Document 2, an ethylene-propylene-butene copolymer (terpolymer) having low crystallinity is used for the surface layer, and the polypropylene film has a high thermal shrinkage percentage, so that there is a problem in that the water vapor barrier property and the oxygen barrier property do not have sufficient values. Moreover, in the polypropylene film described in Patent Document 2, inorganic particles are added to the surface layer for the purpose of imparting easy slipperiness, and coarse projections are present on the surface layer on the side where the vapor-deposited layer is laminated. Therefore, particularly when the transparent vapor-deposited layer having a small film thickness is laminated, there is a problem in that defects such as pinholes and cracks are easily generated in the vapor-deposited layer, and the water vapor barrier property and the oxygen barrier property are deteriorated.

It is therefore an object of the present invention to provide a polypropylene film that is stable to heat during vapor deposition and heat sterilization treatment when used in packaging applications, and that is excellent in water vapor barrier property and oxygen barrier property particularly when a transparent vapor-deposited layer is laminated.

The inventors of the present invention have conducted intensive studies in order to solve the above problems and achieved the following present invention. That is, the present invention according to an embodiment is a polypropylene film containing a polypropylene-based resin as a main component, in which a value (strength X) obtained by multiplying a film thickness by an F5 value in a direction perpendicular to a principal orientation axis is 400 N/m or more and 2000 N/m or less, and as measured by thermomechanical analysis (TMA), when: a thermal shrinkage percentage (%) at 100° C. in the direction perpendicular to the principal orientation axis is $S_{MD,100°\ C.}$; a thermal shrinkage percentage (%) at 130° C. in the direction perpendicular to the principal orientation axis is $S_{MD,130°\ C.}$; a thermal shrinkage percentage (%) at 100° C. in a direction of the principal orientation axis is $S_{TD,100°\ C.}$; and a thermal shrinkage percentage (%) at 130° C. in the direction of the principal orientation axis is $S_{TD,130°\ C.}$, the polypropylene film satisfies $|S_{MD,100°\ C.}-S_{MD,130°\ C.}| \leq 2.00$ and $|S_{TD,100°\ C.}-S_{TD,130°\ C.}| \leq 2.50$.

According to the present invention, it is possible to obtain a polypropylene film that is excellent in structural stability to heat during vapor deposition, has a favorable water vapor barrier property and oxygen barrier property particularly when a transparent vapor-deposited layer is laminated, and is further stable to heat during heat sterilization treatment as well.

DETAILED DESCRIPTION OF EMBODIMENTS OF THE INVENTION

Hereinafter, a polypropylene film of the present invention will be described in detail. The polypropylene film according to embodiments of the present invention contains a polypropylene-based resin as a main component, in which a value (strength X) obtained by multiplying a film thickness by an F5 value in a direction perpendicular to a principal orientation axis is 400 N/m or more and 2000 N/m or less, and as measured by thermomechanical analysis (TMA), when: a thermal shrinkage percentage (%) at 100° C. in the direction perpendicular to the principal orientation axis is $S_{MD,100°\ C.}$; a thermal shrinkage percentage (%) at 130° C. in the direction perpendicular to the principal orientation axis is $S_{MD,130°\ C.}$; a thermal shrinkage percentage (%) at 100° C. in a direction of the principal orientation axis is $S_{TD,100°\ C.}$; and a thermal shrinkage percentage (%) at 130° C. in the direction of the principal orientation axis is $S_{TD,130°\ C.}$, the polypropylene film satisfies $|S_{MD,100°\ C.}-S_{MD,130°\ C.}| \leq 2.00$ and $|S_{TD,100°\ C.}-S_{TD,130°\ C.}| \leq 2.50$. Note that $|S_{MD,100°\ C.}-S_{MD,130°\ C.}|$ represents an absolute value of $S_{MD,100°\ C.}-S_{MD,130°\ C.}$, and $|S_{TD,100°\ C.}-S_{TD,130°\ C.}|$ represents an absolute value of $S_{TD,100°\ C.}-S_{TD,130°\ C.}$.

In the present invention, the polypropylene film refers to an article formed into a sheet shape containing 80% by mass or more and 100% by mass or less of polypropylene-based resin when all the constituent components are taken as 100% by mass. The polypropylene-based resin refers to a resin in which a propylene unit accounts for 90 mol % or more and 100 mol % or less when all the constituent units constituting the resin are taken as 100 mol %.

In the polypropylene film according to embodiments of the present invention, it is important that the value (strength X) obtained by multiplying the film thickness by the F5 value in the direction perpendicular to the principal orientation axis is 400 N/m or more and 2000 N/m or less. The principal orientation axis of the polypropylene film can be determined on the basis of a stress of maximum point strength when a tensile test is performed at a tensile speed of 300 mm/min in an atmosphere of 23° C. and 65% RH, and a detailed measurement method and conditions will be described later. In addition, the F5 value refers to a stress applied to the polypropylene film when an elongation rate reaches 5% in the tensile test, and a detailed measurement method and conditions will be described later.

By setting the strength X to 400 N/m or more, the mechanical strength of the polypropylene film becomes sufficiently high, and it is possible to make the polypropylene film less likely to be broken against sagging and tension during vapor deposition and conveyance, which may occur particularly when the polypropylene film is used in packaging applications. In addition, by setting the strength X to 2000 N/m or less, it is possible to prevent the polypropylene film from being extremely difficult to deform, and for example, in a configuration in which a D layer to be described later is laminated, it is possible to reduce a deterioration in water vapor barrier property and oxygen barrier property due to cracks generated in the D layer during conveyance and bag-forming processing. From the above viewpoint, the lower limit of the strength X is preferably 500 N/m, more preferably 600 N/m. In addition, from the above viewpoint, the upper limit of the strength X is preferably 1800 N/m, more preferably 1600 N/m.

A method for setting the strength X to 400 N/m or more and 2000 N/m or less or within the above preferable range is not particularly limited, and examples thereof include a method in which a stretching ratio in a longitudinal direction is set to 4.5 times or more in a sequential biaxial stretching method during film formation of the polypropylene film, a method in which a stretching temperature in the longitudinal direction is set to 124° C. or less, preferably 120° C. or less, more preferably 115° C. or less, and still more preferably 110° C. or less, and a method in which the thickness of the polypropylene film is set to more than 10 μm and 60 μm or less. More specifically, the strength X can be increased by increasing the stretching ratio in the longitudinal direction in the sequential biaxial stretching method, decreasing the stretching temperature in the longitudinal direction, and increasing the thickness of the polypropylene film. Note that these methods can be used in appropriate combination.

In addition, in the polypropylene film according to embodiments of the present invention, the F5 value in the direction perpendicular to the principal orientation axis is preferably 35 MPa or more and 100 MPa or less. By setting the F5 value in the direction perpendicular to the principal orientation axis to 35 MPa or more, the mechanical strength of the polypropylene film becomes sufficiently high, and it is possible to make the polypropylene film less likely to be broken against sagging and tension during vapor deposition and conveyance, which may occur particularly when the polypropylene film is used in packaging applications. In addition, by setting the F5 value in the direction perpendicular to the principal orientation axis to 100 MPa or less, it is possible to prevent the polypropylene film from being extremely difficult to deform, and for example, in a configuration in which the D layer to be described later is laminated, it is possible to reduce a deterioration in water vapor barrier property and oxygen barrier property due to cracks generated in the D layer during conveyance and bag-forming processing. From the above viewpoint, the lower limit of the F5 value in the direction perpendicular to the principal orientation axis is preferably 38 MPa, and more preferably 41 MPa.

A method for setting the F5 value in the direction perpendicular to the principal orientation axis to 35 MPa or more and 100 MPa or less or within the above preferable range is not particularly limited, and examples thereof include a method in which the stretching ratio in the longitudinal direction is set to 4.5 times or more in the sequential biaxial stretching method during film formation of the polypropylene film, and a method in which the stretching temperature in the longitudinal direction is set to 124° C. or less, preferably 120° C. or less, more preferably 115° C. or less, and still more preferably 110° C. or less. More specifically, the F5 value in the direction perpendicular to the principal orientation axis can be increased by increasing the stretching ratio in the longitudinal direction in the sequential biaxial stretching method and decreasing the stretching temperature in the longitudinal direction. Note that these methods can be used singly or in combination.

In addition, in the polypropylene film according to embodiments of the present invention, it is important that as measured by thermomechanical analysis (TMA), when: the thermal shrinkage percentage (%) at 100° C. in the direction perpendicular to the principal orientation axis is $S_{MD,100°\ C.}$; the thermal shrinkage percentage (%) at 130° C. in the direction perpendicular to the principal orientation axis is $S_{MD,130°\ C.}$; the thermal shrinkage percentage (%) at 100° C. in the direction of the principal orientation axis is $S_{TD,100°\ C.}$; and the thermal shrinkage percentage (%) at 130° C. in the direction of the principal orientation axis is $S_{TD,130°\ C.}$, the polypropylene film satisfies $|S_{MD,100°\ C.}-S_{MD,130°\ C.}| \leq 2.00$ and $|S_{TD,100°\ C.}-S_{TD,130°\ C.}| \leq 2.50$.

The polypropylene film satisfying the above requirements means that the polypropylene film is excellent in thermal dimensional stability at a high temperature. Therefore, for example, when the D layer to be described later is laminated by vapor deposition, it is possible to inhibit defects such as pinholes and cracks from being generated in the D layer by the polypropylene film shrinking by heat during vapor deposition, and to improve the water vapor barrier property and the oxygen barrier property of a laminate in which the D layer is laminated. In addition, when high-temperature treatment such as heat sterilization treatment is performed after bag-forming processing, it is possible to inhibit the shrinkage of the polypropylene film, and to prevent the deterioration in the water vapor barrier property and the oxygen barrier property. From the above viewpoint, the upper limit of $|S_{MD,100°\ C.}-S_{MD,130°\ C.}|$ is preferably 1.50%, and more preferably 1.00%, and the upper limit of $|S_{TD,100°\ C.}-S_{TD,130°\ C.}|$ is preferably 2.00%, and more preferably 1.50%. The lower limits of $|S_{MD,100°\ C.}-S_{MD,130°\ C.}|$ and $|S_{TD,100°\ C.}-S_{TD,130°\ C.}|$ are not particularly limited, and are substantially 0.00%.

A method for making the polypropylene film satisfy $|S_{MD,100°\ C.}-S_{MD,130°\ C.}| \leq 2.00$ is not particularly limited, and examples thereof include a method of adjusting the stretching temperature in the longitudinal direction, the stretching ratios in the longitudinal direction and a width direction, and heat treatment conditions during film formation of the polypropylene film. More specifically, examples of the method include setting the stretching temperature in the longitudinal direction to 124° C. or less, preferably 120° C. or less, more preferably 115° C. or less, and still more preferably 110° C. or less, setting the lower limit of the stretching ratio in the longitudinal direction to 2.0 times, preferably 4.0 times, and more preferably 4.5 times, and the upper limit to 15 times, preferably 10 times, more preferably 8.0 times, and still more preferably 6.0 times, setting the lower limit of the stretching ratio in the width direction to 7.0 times, preferably 8.0 times, and more preferably 8.5 times, and the upper limit to 20 times, preferably 16 times, and more preferably 12 times, and setting the lower limit of a heat treatment temperature of a tenter to 155° C., preferably 160° C., and more preferably 165° C., and the upper limit to 177° C., preferably 175° C., and more preferably 173° C. during film formation. Examples of the method also include a method in which a differential distribution value when a logarithmic molecular weight Log (M) of a polypropylene-based resin contained in a B layer to be described later is 6.5 is set to 1.0% or more and 10% or less, and a method in which a petroleum resin is added to the B layer to be described later.

$S_{MD,100°\ C.}$, $S_{MD,130°\ C.}$, $S_{TD,100°\ C.}$, and $S_{TD,130°\ C.}$ can be measured using a known thermomechanical analyzer, and its detailed procedure and respective conditions such as temperature conditions, load conditions, and a test length will be described later in Examples.

In addition, a method for making the polypropylene film satisfy $|S_{TD,100°\ C.}-S_{TD,130°\ C.}| \leq 2.50$ is not particularly limited, and examples thereof include a method of adjusting the conditions of the tenter device during film formation of the polypropylene film. More specifically, examples of the method include setting the lower limit of the heat treatment temperature of the tenter to 155° C., preferably 160° C., and more preferably 165° C., and the upper limit to 177° C., preferably 175° C., and more preferably 173° C. At this time, from the viewpoint of satisfying $|S_{TD,100°\ C.}-S_{TD,130°\ C.}| \leq 2.50$, it is also preferable to set the lower limit of a relaxation ratio in relaxation treatment to 2%, preferably 5%, more preferably 7%, still more preferably 8%, particularly preferably 9%, and most preferably 11%, and the upper limit to 20%, preferably 18%, more preferably 17%, and still more preferably 16%. Examples of the method further include a method in which the differential distribution value when the logarithmic molecular weight Log (M) of the polypropylene-based resin contained in the B layer to be described later is 6.5 is set to 1.0% or more and 10% or less, and a method in which the petroleum resin is added to the B layer to be described later.

In addition, in the polypropylene film according to embodiments of the present invention, a sharpness Sku of at least one surface is preferably 300 or less. Here, the sharpness Sku refers to Sku measured by three-dimensional non-contact surface shape measurement. Hereinafter, the sharpness Sku may be simply referred to as Sku or Sku value. By setting the Sku value of at least one surface to 300 or less, this surface becomes sufficiently smooth with no coarse projection or the like, and as a result, when the D layer to be described later including a vapor-deposited layer is laminated, the thickness of the D layer can be made uniform, and defects such as pinholes and cracks in the D layer can be inhibited. Therefore, the water vapor barrier property and the oxygen barrier property of the laminate in which the D layer is laminated can be improved. From the above viewpoint, the upper limit of the Sku value of at least one surface is preferably 100, more preferably 50, and still more preferably 10. In addition, the lower limit value of the Sku is 1 from the viewpoint of imparting appropriate slipperiness to the polypropylene film and improving the conveyance property.

The Sku and Sa to be described later can be measured with a known three-dimensional non-contact surface shape measuring instrument (e.g., a scanning white-light interference microscope of Hitachi High-Tech Science Corporation) and its attached analysis system, and detailed measurement conditions and analysis conditions are described in Examples.

A method for controlling the Sku value of at least one surface to 300 or less or within the above preferable range is not particularly limited, and examples thereof include a method in which a polypropylene-based resin having a branched structure or a crystal nucleating agent is added in an amount of more than 0% by mass and 5% by mass or less as a raw material in addition to a straight-chain polypropylene-based resin, a method in which the temperature of a casting drum is set to 30° C. or less, a method in which the stretching temperature in the longitudinal direction is set to 124° C. or less, preferably 120° C. or less, more preferably 115° C. or less, and still more preferably 110° C. or less in the sequential biaxial stretching method, a method in which the stretching ratio in the longitudinal direction is set to 4.5 times or more, and preferably containing substantially no particles that cause coarse projections, and in a case of containing the particles, using no inorganic or organic particles such as alumina, silica, crosslinked silicone, and crosslinked polymethyl methacrylate having an average particle diameter exceeding 300 nm. More specifically, the Sku value of at least one outermost surface can be controlled to 300 or less or within the above preferable range by adding the polypropylene-based resin having a branched structure or the crystal nucleating agent, decreasing the temperature of cooling solidification of a molten sheet, decreasing the stretching temperature in the longitudinal direction in the sequential biaxial stretching method, and increasing the stretching ratio. Note that these methods can be used in appropriate combination, but it is not essential to combine all the methods.

In addition, in the polypropylene film according to embodiments of the present invention, when a surface having a relatively small Sku is defined as an a-surface, a half bandwidth around 400 cm$^{-1}$ obtained by micro-Raman measurement of the a-surface is preferably 4.00 cm$^{-1}$ or more and 8.00 cm$^{-1}$ or less. Although the detailed micro-Raman measurement method will be described later, a structure having a thickness of about 1 μm from a surface layer is evaluated. The half bandwidth around 400 cm$^{-1}$ obtained by the micro-Raman measurement is a parameter having a strong negative correlation with the degree of crystallinity. Specifically, the smaller the half bandwidth around 400 cm$^{-1}$, the larger the degree of crystallinity.

That the half bandwidth around 400 cm$^{-1}$ of the a-surface is 8.00 cm$^{-1}$ or less means that the degree of crystallinity in the vicinity of the a-surface is sufficiently large. Therefore, deformation of the polypropylene film due to heat during vapor deposition is reduced, so that defects such as pinholes and cracks in the D layer to be described later are reduced when the D layer is laminated by vapor deposition, and the water vapor barrier property and the oxygen barrier property of the laminate in which the D layer is laminated are enhanced. From the above viewpoint, the upper limit of the half bandwidth around 400 cm$^{-1}$ of the a-surface is more preferably 7.40 cm$^{-1}$, still more preferably 6.90 cm$^{-1}$, and particularly preferably 6.80 cm$^{-1}$. In addition, that the half bandwidth around 400 cm$^{-1}$ of the a-surface is 4.00 cm$^{-1}$ or more means that a certain amount of amorphous portion exists in the vicinity of the a-surface. Therefore, when the D layer to be described later is laminated by vapor deposition, adhesion between an A layer and the D layer can be improved.

A method for setting the half bandwidth around 400 cm$^{-1}$ of the a-surface to 4.00 cm$^{-1}$ or more and 8.00 cm$^{-1}$ or less or within the above preferable range is not particularly limited, and examples thereof include a method of using a polypropylene-based resin having a high degree of crystallinity as a raw material (more specifically, a method of using a polypropylene-based resin having a meso-pentad fraction of 0.93 or more), a method in which the stretching ratio in the longitudinal direction is set to 4.0 times or more, and preferably 4.5 times or more in the sequential biaxial stretching method, and a method in which the stretching temperature in the longitudinal direction is set to 124° C. or less, preferably 120° C. or less, more preferably 115° C. or less, and still more preferably 110° C. or less. More specifically, the half bandwidth around 400 cm$^{-1}$ of the a-surface can be reduced by increasing the meso-pentad fraction of the polypropylene-based resin in the layer including the a-surface, increasing the stretching ratio in the longitudinal direction in the sequential biaxial stretching method, and decreasing the stretching temperature in the longitudinal direction. Note that these methods can be used in appropriate combination, but it is not essential to combine all the methods.

In addition, in the polypropylene film according to embodiments of the present invention, a surface roughness Sa value of the a-surface is preferably 50 nm or less. Here, the surface roughness Sa refers to an Sa value measured by three-dimensional non-contact surface shape measurement. Hereinafter, the surface roughness Sa value may be referred to as Sa or Sa value. By setting the Sa value of the a-surface to 50 nm or less, the a-surface becomes sufficiently smooth with no coarse projection or the like, and as a result, when the D layer to be described later including the vapor-deposited layer is laminated, the thickness of the D layer can be made uniform, and defects such as pinholes and cracks in the D layer can be inhibited. Therefore, the water vapor barrier property and the oxygen barrier property of the laminate in which the D layer is laminated can be improved. From the above viewpoint, the upper limit of the Sa value of the a-surface is more preferably 40 nm, still more preferably 30 nm, particularly preferably 24 nm, and most preferably 21 nm or less. In addition, the lower limit of the Sa value is not particularly limited, but is 10 nm from the viewpoint of imparting appropriate slipperiness to the polypropylene film and improving the conveyance property.

A method for controlling the Sa value of the a-surface to 50 nm or less or within the above preferable range is not particularly limited, and examples thereof include a method in which a polypropylene-based resin having a branched structure or a crystal nucleating agent is added in an amount of more than 0% by mass and 5% by mass or less as a raw material of the layer including the a-surface in addition to a straight-chain polypropylene-based resin, a method in which the temperature of the casting drum is set to 30° C. or less, and a method in which the stretching ratio in the longitudinal direction is set to 4.5 times or more in the sequential biaxial stretching method. More specifically, the Sa value of the a-surface can be controlled to 50 nm or less or within the above preferable range by increasing the amount of the polypropylene-based resin having a branched structure or the crystal nucleating agent in the layer including the a-surface, decreasing the temperature of cooling solidification of the molten sheet, and increasing the stretching ratio in the longitudinal direction in the sequential biaxial stretching method. Note that these methods can be used in appropriate combination, but it is not essential to combine all the methods.

In addition, in the polypropylene film according to embodiments of the present invention, surface free energy of the above a-surface is preferably 32 mN/m or more and 50 mN/m or less. A method for measuring the surface free energy will be described later. By adopting such a range, the adhesion between the A layer and the D layer can be improved. The lower limit value of the surface free energy is more preferably 34 mN/m, more preferably 36 mN/m.

A method for controlling the surface free energy to 32 mN/m or more and 50 mN/m or less or within the above preferable range is not particularly limited, and examples thereof include a method in which the film is guided to the outside of the tenter at the time of film formation of the polypropylene film, and the above a-surface is then subjected to corona discharge treatment or plasma treatment in the air or in an atmosphere gas of oxygen, nitrogen, hydrogen, argon, carbon dioxide gas, silane gas, or a mixture thereof.

In addition, it is preferable that the polypropylene film according to embodiments of the present invention has at least two kinds of layers (the A layer, the B layer) containing the polypropylene-based resin as the main component, and the fraction of a propylene unit in the A layer is 97.0 mol % or more and 100.0 mol % or less, and is larger than the fraction of a propylene unit in the entire polypropylene film. The "layer containing the polypropylene-based resin as the main component" refers to a layer containing the polypropylene-based resin in an amount of more than 50% by mass and 100% by mass or less when all the constituent components of the layer are taken as 100% by mass. Hereinafter, the "main component" can be interpreted in the same manner. To "have at least two kinds of layers (the A layer, the B layer) containing the polypropylene-based resin as the main component" refers to a mode including a plurality of layers containing the polypropylene-based resin as the main component, in which a composition of at least one layer is different from that of another layer. At this time, the presence or absence of a layer containing a resin other than the polypropylene-based resin as the main component does not matter. The "fraction of a propylene unit in the layer" refers to the fraction (mol %) of the propylene unit in the layer when the constituent units of all the resin components constituting the layer are taken as 100 mol %. The "resin component" refers to a so-called polymer, but also includes a petroleum resin or a terpene resin having substantially no polar group to be described later. In addition, the "fraction of a propylene unit in the entire polypropylene film" refers to the fraction (mol %) of the propylene unit in the polypropylene film when the constituent units of all the resin components constituting the polypropylene film are taken as 100 mol %. Note that the "fraction of a propylene unit in the layer" is obtained for one layer. That is, for example, even when the polypropylene film has a three-layer configuration, the fraction of the propylene unit is not obtained by summing outermost layers on opposite sides, but the fraction of the propylene unit is obtained for each outermost layer. The "fraction of a propylene unit in the layer" can be measured by analyzing a layer sample by a known $^{13}$C-NMR method.

By setting the fraction of the propylene unit in the A layer to 97.0 mol % or more, movement and loosening of molecular chain on the surface are inhibited, and a structure that is very stable to heat during vapor deposition is obtained. Therefore, when the D layer to be described later (a layer containing a metal and/or an inorganic compound in a total amount of more than 50% by mass and 100% by mass or less) including the vapor-deposited layer is laminated to form the laminate, the water vapor barrier property and the oxygen barrier property thereof can be improved. That is, since the D layer can be suitably formed on the surface of the A layer, the A layer is preferably located on at least one outermost surface. That "the A layer is located on at least one outermost surface" refers to a mode in which the A layer is located on the top layer on one side, and a mode in which the number of layers is three or more and the A layer is located on the top layers on the opposite sides. In addition, from the above viewpoint, the lower limit of the fraction of the propylene unit in the A layer is preferably 98.0 mol %, more preferably 98.5 mol %, still more preferably 99.0 mol %, particularly preferably 99.5 mol %, and most preferably 99.9 mol %. That the fraction of the propylene unit in the A layer is 100 mol % means that the molecular chain of the polypropylene-based resin constituting the A layer is composed only of the propylene unit.

In the following, a method for adjusting the fraction of the propylene unit in the A layer will be described using an example in which the fraction of the propylene unit in the A layer is 97.0 mol %. The fraction of the propylene unit in the A layer can be set to 97.0 mol % by forming the A layer only with a polypropylene-based resin containing the propylene unit at 97.0 mol % in 100 mol % of the entire molecular chain, or by forming the A layer by mixing equal amounts of a polypropylene-based resin containing the propylene unit at 96.0 mol % and a polypropylene-based resin containing the propylene unit at 98.0 mol % in 100 mol % of the entire molecular chain. That is, the fraction of the propylene unit in the A layer can be increased by increasing the fraction of the propylene unit in the molecular chain, or by increasing the ratio of the polypropylene-based resin having a high fraction of the propylene unit in the molecular chain.

In addition, that the fraction of the propylene unit in the A layer is larger than the fraction of the propylene unit in the entire polypropylene film means that a resin having a smaller fraction of the propylene unit is contained in a layer other than the A layer (for example, the B layer), or that the layer contains the same polypropylene-based resin as the A layer, but the content ratio thereof is lower than that of the A layer. By adopting such a mode, it is easy to impart easy stretchability, low temperature longitudinal stretchability, and the like at the time of film formation to the polypropylene film.

A method for setting the fraction of the propylene unit in the A layer to 97.0 mol % or more and 100.0 mol % or less or within the above preferable range is not particularly limited, and examples thereof include a method of using a polypropylene-based resin the fraction of the propylene unit of which is 97.0 mol % or more and 100.0 mol % or less for the A layer. At this time, the fraction of the propylene unit in the A layer can be increased by increasing the fraction of the propylene unit of the polypropylene-based resin or increasing the ratio of the polypropylene-based resin in the A layer.

In addition, in the polypropylene film according to embodiments of the present invention, the degree of crystallinity of a resin composition of the A layer calculated from a crystal fusion enthalpy ΔHm of the 2nd Run measured by differential scanning calorimetry (DSC) is preferably higher than the degree of crystallinity of a resin composition of the B layer. Details of the measurement method will be described later. By adopting such a range, the degree of crystallinity of the surface on the A layer side is increased, and deformation of the surface layer of the polypropylene film due to heat during vapor deposition is reduced, so that defects such as pinholes and cracks in the D layer to be described later are reduced when the D layer is laminated by vapor deposition, and the water vapor barrier property and the oxygen barrier property of the laminate in which the D layer is laminated are enhanced. In addition, by relatively decreasing the degree of crystallinity of the B layer, it becomes easy to uniformly stretch the film during film formation.

A method for making the degree of crystallinity of the resin composition of the A layer higher than the degree of crystallinity of the resin composition of the B layer is not particularly limited, and examples thereof include a method of using a homopolypropylene resin having a high degree of crystallinity (specifically, a homopolypropylene resin having a melting point of 151° C. or more, more preferably 155° C. or more, still more preferably 162° C. or more, even more preferably 164° C. or more, particularly preferably 166° C. or more, and most preferably 167° C. or more, or a meso-pentad fraction of 0.93 or more, more preferably 0.95 or more, still more preferably 0.96 or more, and particularly preferably 0.97 or more) as the polypropylene-based resin for the A layer. Examples of the method also include a method of using a homopolypropylene resin, an ethylene-propylene copolymer, or an ethylene-propylene-butene copolymer having a lower degree of crystallinity than the polypropylene-based resin for the A layer, and a method of adding the petroleum resin to be described later to a homopolypropylene resin having the same or a higher meso-pentad fraction as or than the A layer, as the resin composition for the B layer.

<Polypropylene-Based Resin>

In the polypropylene film according to embodiments of the present invention, a molecular weight distribution of the polypropylene-based resin contained in the A layer preferably satisfies $15 \leq Mz/Mn \leq 36$, and the A layer more preferably contains the polypropylene-based resin as the main component. By setting Mz/Mn to 15 or more, it becomes easy to uniformly stretch the film at the time of producing the polypropylene film. As a result, the Sku value and the Sa value of the A layer surface can be easily controlled to fall within the above preferable ranges, and the water vapor barrier property and the oxygen barrier property of the laminate in which the D layer to be described later including the vapor-deposited layer is laminated can be improved. In addition, by setting Mz/Mn to 36 or less, it becomes easy to satisfy $|S_{MD,100° C.} - S_{MD,130° C.}| \leq 2.00$ and $|S_{TD,100° C.} - S_{TD,130° C.}| \leq 2.50$ with respect to the thermal shrinkage percentage measured by the thermomechanical analysis (TMA) of the polypropylene film according to embodiments of the present invention, and when laminating the D layer to be described later including the vapor-deposited layer, it is possible to inhibit defects such as pinholes and cracks from being generated due to shrinkage of the film and to improve the water vapor barrier property and the oxygen barrier property of the laminate in which the D layer is laminated. From the above viewpoint, the range of the molecular weight distribution is more preferably $17 \leq Mz/Mn \leq 34$, and still more preferably $20 \leq Mz/Mn \leq 33$.

Examples of a method for making Mz/Mn of the polypropylene-based resin satisfy $15 \leq Mz/Mn \leq 36$ or the above preferable requirements include a method of reducing the amount of low molecular weight components by adjusting polymerization conditions (reaction temperature, monomer concentration, reaction time, catalyst ratio, etc.), performing multi-stage polymerization, or blending a plurality of commercially available polypropylene-based resins at the time of producing the polypropylene-based resin. Note that the molecular weight distribution can be measured by known gel permeation chromatography (GPC), and its detailed procedure and conditions will be described later.

The polypropylene-based resin used as the main component of the A layer of the polypropylene film according to embodiments of the present invention preferably has a meso-pentad fraction of 0.93 or more. The meso-pentad fraction is more preferably 0.95 or more, still more preferably 0.96 or more, and particularly preferably 0.97 or more. The meso-pentad fraction is an index indicating the stereo-regularity of a crystal phase of the polypropylene-based resin, and is measured by a nuclear magnetic resonance method (NMR method). In the polypropylene film according to embodiments of the present invention, since the A layer contains the polypropylene-based resin having a meso-pentad fraction of 0.93 or more as the main component, the degree of crystallinity of the A layer becomes high, and there is an effect of enhancing the orientation of the polypropylene film (particularly the A layer). As a result, when the polypropylene film is used in packaging applications, it is possible to inhibit deformation due to heat during vapor deposition, to facilitate uniform lamination of the D layer to be described later including the vapor-deposited film, and to inhibit defects such as pinholes and cracks in the D layer. Therefore, an effect of improving the water vapor barrier property and the oxygen barrier property of the laminate in which the D layer is laminated can be obtained.

The polypropylene-based resin used for the A layer of the polypropylene film of the present invention may be one kind or a mixture of two or more kinds. However, from the viewpoint of reducing deformation of the polypropylene film due to heat during vapor deposition, the melting point of the polypropylene-based resin as the main component is preferably 151° C. or more, more preferably 155° C. or more, still more preferably 162° C. or more, and even more preferably 164° C. or more, particularly preferably 166° C. or more, and most preferably 167° C. or more. When the polypropylene-based resin as the main component of the A layer has a melting point of 151° C. or more, the crystallinity of the A layer is kept high, so that the deformation of the polypropylene film due to heat during vapor deposition is reduced. That is, when the D layer to be described later is laminated by vapor deposition, defects such as pinholes and cracks in the D layer are reduced, and the water vapor barrier property and the oxygen barrier property of the laminate in which the D layer is laminated are enhanced.

In a case where two or more kinds of polypropylene-based resins are used for the A layer of the polypropylene film according to embodiments of the present invention, a modified polypropylene-based resin is suitably used as the polypropylene-based resin other than the main component. By using such a resin, the content of a nitrogen element or an oxygen element on the A layer surface increases, and when the D layer to be described later is laminated, the adhesion between the A layer and the D layer can be enhanced. Examples of the modified polypropylene-based resin include "ADMER" (registered trademark) series (unsaturated carboxylic acid-modified product of polypropylene) of Mitsui Chemicals, Inc. and "UMEX" series (acid-modified low molecular weight polypropylene-based resin) of Sanyo Chemical Industries, Ltd. From the viewpoint of keeping the crystallinity of the A layer high, the content of the modified polypropylene-based resin in the A layer is preferably 40% by mass or less, more preferably 30% by mass or less, and still more preferably 20% by mass or less, when the total amount of the resins of the A layer is taken as 100% by mass.

In addition, the A layer of the polypropylene film according to embodiments of the present invention may contain the polypropylene-based resin as the main component and a thermoplastic resin incompatible with the polypropylene-based resin. Hereinafter, the "thermoplastic resin incompatible with the polypropylene-based resin" may be simply referred to as "incompatible resin". By blending the polypropylene-based resin and the incompatible resin, it is possible to impart fine and soft surface unevenness to the A layer surface through the use of a domain structure thereof. Therefore, it is possible to impart appropriate slipperiness without using particles or a lubricant, and to improve the handleability of the laminate after the vapor-deposited layer is laminated without deteriorating the water vapor barrier property and the oxygen barrier property.

Examples of the incompatible resin include vinyl polymer resins containing various polyolefin-based resins, polymethylpentene-based resins, polyester-based resins, polyamide-based resins, polyphenylene sulfide-based resins, polyimide-based resins, and polycarbonate-based resins. Particularly the polyolefin-based resin is preferable because it has high affinity with the polypropylene resin and can enhance dispersibility in the polypropylene resin. As the polyolefin-based resin, for example, polyethylene, polybutene, a poly (4-methylpentene-1)-based resin (PMP), a cyclic olefin polymer (COP), a cyclic olefin copolymer (COC), an α-olefin-based elastomer, or the like is contained, whereby fine projection shapes can be formed on the film surface, and easy slipperiness can be enhanced. Among them, the polymethylpentene-based resin is particularly preferably used because it has relatively high affinity with the polypropylene-based resin, can be reduced in domain size, and has a melting point equal to or higher than the stretching temperature of the film. In addition, the melting point of the polymethylpentene-based resin is preferably 185° C. to 240° C., and more preferably 220° C. to 240° C., from the viewpoint of providing extrusion stability in the case of blending with polypropylene and surface unevenness through the use of a domain sea-island structure. In view of these characteristics, in the polypropylene film according to embodiments of the present invention, a polymer containing 4-methylpentene-1 as a main constituent unit (constituent unit contained at 80 mol % or more and 100 mol % or less in 100 mol % of all the constituent units) is preferable. For example, "TPX" (registered trademark) MX series, "TPX" (registered trademark) DX series, and "TPX" (registered trademark) RT series sold as "TPX" (registered trademark) series by Mitsui Chemicals, Inc. can be preferably used. Specifically, "TPX" (registered trademark) MX002, MX004, DX310, DX845, and RT31 are preferable from the viewpoint of having relatively high affinity with the polypropylene-based resin and capable of being reduced in domain size.

From the viewpoint of easily setting the strength X of the polypropylene film to 400 N/m or more and 2000 N/m or less, the B layer of the polypropylene film of the present invention contains the polypropylene-based resin as the main component, and the melting point of the resin composition of the B layer is preferably 135° C. or more and 175° C. or less. From the above viewpoint, the lower limit of the melting point of the resin composition of the B layer is preferably 140° C., more preferably 145° C., more preferably 150° C., still more preferably 155° C., particularly preferably 158° C., and most preferably 161° C. On the other hand, the upper limit thereof is preferably 173° C., more preferably 171° C., still more preferably 169° C., and particularly preferably 167° C. By setting the melting point of the resin composition of the B layer within such a range, it becomes easy to control the strength X of the polypropylene film to 400 N/m or more and 2000 N/m or less. Note that the melting point of the resin composition of the B layer can be read as the peak temperature of a peak having the largest peak area among endothermic peaks due to fusion of the 2nd Run when the B layer of the polypropylene film is analyzed by differential scanning calorimetric analysis (DSC).

In addition, the polypropylene-based resin contained in the B layer of the polypropylene film according to embodiments of the present invention preferably has a differential distribution value of 1.0% or more and 10% or less when the logarithmic molecular weight Log (M) is 6.5 in a molecular weight distribution curve measured by gel permeation chromatography. The upper limit is preferably 9.0%, more preferably 8.0%, still more preferably 7.5%, particularly preferably 6.5%, and most preferably 5.9%. Since the differential distribution value is 1.0% or more when the logarithmic molecular weight Log (M) is 6.5, high molecular weight components to be tie molecules become sufficient and uniform stretchability is enhanced at the time of stretching the polypropylene film. On the other hand, since the differential distribution value is 10% or less when the logarithmic molecular weight Log (M) is 6.5, the molecular chain relaxed when heat is applied does not become excessive in the laminate produced from the polypropylene film, and it becomes easy to satisfy $|S_{MD,100° C.}-S_{MD,130° C.}| \leq 2.00$ and $|S_{TD,100° C.}-S_{TD,130° C.}| \leq 2.50$.

In addition, the B layer of the polypropylene film according to embodiments of the present invention can contain a polyolefin-based resin having low crystallinity and a low melting point, an amorphous polyolefin-based resin, and the like in addition to the polypropylene-based resin as the main component. Specific examples of such a resin include ethylene-propylene random copolymers, ethylene-propylene-butene random copolymers, propylene-butene random copolymers, cyclic olefin polymers, and cyclic olefin-ethylene copolymers. In addition, the B layer of the polypropylene film according to embodiments of the present invention can also contain a polypropylene-based resin having a long-chain branched structure, a petroleum resin, a terpene resin, a crystal nucleating agent, and the like, and can further contain various additives, for example, an antioxidant, a heat stabilizer, a chlorine scavenger, a sliding agent, an antistatic agent, a filler, a viscosity modifier, and a coloring inhibitor as long as the object of the present invention is not impaired. From the viewpoint of setting the strength X of the polypropylene film to 400 N/m or more and 2000 N/m or less, the components other than the polypropylene-based resin as the main component are preferably 20% by mass or less when all the constituent components of the B layer are taken as 100% by mass.

Among the above components, it is preferable that the B layer in the polypropylene film according to embodiments of the present invention particularly contains the petroleum resin or the terpene resin having substantially no polar group. In the present specification, the petroleum resin is a petroleum resin that does not have a polar group including a hydroxyl group, a carboxyl group, a halogen group, a sulfone group, a modified product thereof, or the like, and is specifically a resin made of, as a main raw material, a cyclopentadiene-based hydrocarbon made of a petroleum-based unsaturated hydrocarbon as a raw material, or a higher olefin-based hydrocarbon. One that is compatible with the polypropylene resin and increases the glass transition temperature of the film layer constituting the B layer is particularly preferable. From this viewpoint, the glass transition temperature or softening point of the petroleum resin or the terpene resin having substantially no polar group is preferably 100° C. or more, more preferably 110° C. or more, and still more preferably 120° C. or more.

When the glass transition temperature of the petroleum resin or the terpene resin having substantially no polar group is lower than 100° C., the heat resistance of the film becomes insufficient, and it may be difficult to control $|S_{MD,100° C.}-S_{MD,130° C.}|$ and $|S_{TD,100° C.}-S_{TD,130° C.}|$ within the preferable range of the present application. In addition, the terpene resin having substantially no polar group is a terpene resin that does not have a polar group including a hydroxyl group, an aldehyde group, a ketone group, a carboxyl group, a halogen group, a sulfone group, a modified product thereof, and the like that is, a hydrocarbon having a composition of $(C_5H_8)n$ and a modified compound derived therefrom. Here, n is a natural number of about 2 to 20. The terpene resin is sometimes referred to as terpenoid, and representative compounds include pinene, dipentene, carene, myrcene, ocimene, limonene, terpinolene, terpinene, sabinene, tricyclene, bisabolene, zingiperene, santalene, camphorene, mylene, and totalene. In the case of the film according to embodiments of the present invention, hydrogen is added, and a hydrogenation rate thereof is preferably 90% or more, more preferably 99% or more. Particularly, β-pinene, hydrogenated β-pinene, hydrogenated β-dipentene, and the like are preferable. When the B layer contains the petroleum resin or the terpene resin having substantially no polar group, uniform stretchability during film formation is enhanced, and the stretching temperature in the longitudinal direction is easily set to 124° C. or less. Therefore, it becomes easy to enhance the orientation of the polypropylene film in the longitudinal direction and to enhance the heat resistance. In addition, the void volume of an amorphous portion of polypropylene can be reduced to improve the water vapor barrier property. Furthermore, when the B layer contains the petroleum resin, thermal shrinkage in a high temperature range of the polypropylene film according to embodiments of the present invention is inhibited, and it becomes easy to satisfy $|S_{MD,100°\ C.}-S_{MD,130°\ C.}|\leq 2.00$ and $|S_{TD,100°\ C.}-S_{TD,130°\ C.}|\leq 2.50$ with respect to the thermal shrinkage percentage measured by the thermomechanical analysis (TMA). From the above viewpoint, the petroleum resin is preferably added to the B layer in an amount of 3% by mass or more and 20% by mass or less, the lower limit is preferably 5% by mass, more preferably 6% by mass, and still more preferably 7% by mass, and the upper limit is preferably 18% by mass, more preferably 17% by mass, and still more preferably 16% by mass when all the constituent components of the B layer are taken as 100% by mass. In addition, the softening point of the petroleum resin is preferably 90° C. or more and 140° C. or less, the lower limit is preferably 100° C., and the upper limit is preferably 130° C. By adopting such a range, it is easy to enhance the uniform stretchability during film formation of the polypropylene film. In the B layer in the polypropylene film according to embodiments of the present invention, particularly $|S_{MD,100°\ C.}-S_{MD,130°\ C.}|\leq 2.00$ and $|S_{TD,100°\ C.}-S_{TD,130°\ C.}|\leq 2.50$ are obtained by adopting a mode in which the melting point of the resin composition is controlled to fall within the above-mentioned preferable range, and the petroleum resin is contained at a ratio within the above-mentioned preferable range, so that the water vapor barrier property and the oxygen barrier property after vapor deposition are easily improved.

The polypropylene-based resin used in the polypropylene film of the present invention preferably has a melt flow rate (MFR) of 1 to 10 g/10 min (230° C., load: 21.18 N), more preferably 2 to 8 g/10 min, and still more preferably 2 to 5 g/10 min (230° C., load: 21.18 N) in any of the A layer, the B layer, and a C layer (described later) from the viewpoint of film formability. In order to set the melt flow rate (MFR) to the above value, for example, a method of controlling an average molecular weight or molecular weight distribution is adopted.

The polypropylene film according to embodiments of the present invention preferably has a thickness of more than 10 μm and 60 μm or less, from the viewpoint of making the polypropylene film suitable for packaging applications. By making the thickness larger than 10 μm, it is possible to make the film less likely to be broken against sagging and tension during vapor deposition and conveyance. From the above viewpoint, the lower limit of the thickness is more preferably 12 μm, and still more preferably 14 μm. On the other hand, by making the thickness 60 μm or less, the handleability can be improved, and production cost can also be reduced. From the above viewpoint, the upper limit value of the thickness is more preferably 50 μm, still more preferably 40 μm, and particularly preferably 19 μm. Note that the thickness of the polypropylene film can be determined by measuring the thickness at 10 optional positions of the polypropylene film with a contact-type micrometer in an atmosphere of 23° C. and 65% RH, and calculating the arithmetic average value of all the obtained measurement values.

A method for setting the thickness of the polypropylene film to more than 10 μm and 60 μm or less or within the above preferable range is not particularly limited, and for example, a method of adjusting a discharge amount at the time of melt-extrusion of the polypropylene-based resin composition, a method of adjusting the rotation speed of the casting drum at the time of cooling solidification of the molten sheet, a method of adjusting a lip gap of a spinneret for discharging the molten sheet, a method of adjusting the stretching ratio in the longitudinal direction, a method of adjusting the stretching ratio in the width direction, a method of adjusting the relaxation ratio, and the like can be used. More specifically, the thickness can be reduced by reducing the discharge amount, increasing the rotation speed of the casting drum, narrowing the lip gap of the spinneret, and increasing the stretching ratios in the longitudinal direction and the width direction and the relaxation ratio.

In addition, in the polypropylene film according to embodiments of the present invention, the A layer preferably has a thickness of 0.3 μm or more and 10 μm or less. By setting the thickness of the A layer within such a range, the polypropylene film has a structure that is very stable to heat during vapor deposition, so that the water vapor barrier property and the oxygen barrier property can be improved when the D layer to be described later (the layer containing a metal and/or an inorganic compound in a total amount of more than 50% by mass and 100% by mass or less) including the vapor-deposited layer is laminated to form the laminate. From the above viewpoint, the lower limit of the thickness of the A layer is preferably 0.5 μm, more preferably 0.8 μm, and the upper limit is preferably 5.0 μm, more preferably 3.0 μm.

<Layer Configuration>

The polypropylene film according to embodiments of the present invention preferably has a layer configuration including the A layer and the B layer as described above, in which the A layer is located on at least one outermost surface. A configuration in which the A layer is located on the outermost surfaces on the opposite sides is cited as a more preferable mode. By adopting such a configuration, it is possible to inhibit the components such as the petroleum resin contained in the B layer from bleeding out to the A layer surface on the side where the vapor-deposited layer is laminated, and to uniformly laminate the vapor-deposited layer. The simplest example of such a mode includes a three-layer configuration of the A layer/the B layer/the A layer, but another layer may be present between the A layer and the B layer. In addition, a configuration in which the A layer, the B layer, and the C layer described below are positioned in this order, and one top layer is the A layer and the other top layer is the C layer is cited as another preferable mode. This configuration will be described below.

<C Layer>

The polypropylene film according to embodiments of the present invention also preferably adopts the configuration including the C layer as a layer different from the A layer and the B layer, in which one top layer is the A layer and the other top layer is the C layer. By adopting such a configuration, it is possible to impart easy slipperiness or heat sealability, and both the functions to the C layer side.

The C layer of the polypropylene film according to embodiments of the present invention may have a composition containing a polypropylene-based resin as a main component, and to which organic or inorganic particles, or the above-described incompatible resin is added for the purpose of imparting easy slipperiness. Among them, the C layer preferably contains the incompatible resin. By adopting such a composition, it is possible to impart fine and soft surface unevenness through the use of a domain structure thereof to the surface of the C layer. Therefore, it is possible to impart appropriate slipperiness without using particles or a lubricant, and to improve the handleability of the laminate after the vapor-deposited layer is laminated. As a result, it is possible to inhibit pinholes and cracks from being generated due to winding and tightening of the vapor-deposited layer in a state in contact with particles when wound up as a laminate roll, and a decrease in the barrier properties associated therewith, and to improve barrier stability to be described later.

In the C layer constituting the polypropylene film according to embodiments of the present invention, the content of the incompatible resin is preferably 0.1% by mass or more and 10% by mass or less in 100% by mass of the entire layer, the lower limit is preferably 0.5% by mass, and more preferably 1% by mass, and the upper limit is preferably 6% by mass, more preferably 4% by mass, and still more preferably 2% by mass. When the content of the incompatible resin in the C layer is 0.1% by mass or more, surface projections are efficiently formed on the C layer surface, so that the slipperiness of the C layer surface is improved, and the above-described handleability is improved. On the other hand, when the content of the incompatible resin in the C layer is 10% by mass or less, excessive domain formation in the C layer is inhibited, and a decrease in transparency due to excessive generation of voids generated at an interface between resins during stretching is reduced.

In the polypropylene film according to embodiments of the present invention, a configuration in which the C layer is a heat seal layer is also preferably adopted from the viewpoint of obtaining heat sealability suitable for packaging applications. The heat sealing is a process of melting and pressure-bonding films through heat treatment when filling/packaging contents and obtaining a bag-like form, and the heat sealability is a property on the film side of being melted/pressure-bonded by heating.

In the case where the C layer of the polypropylene film according to embodiments of the present invention is the heat seal layer, it is preferable to use a polyolefin-based resin having low crystallinity and a low melting point from the viewpoint of imparting low-temperature/high-speed sealability. Specifically, an ethylene-propylene random copolymer, an ethylene-propylene-butene random copolymer, a propylene-butene random copolymer, or the like can be preferably used. In the present invention, the heat seal layer refers to a layer containing more than 50% by mass and 100% by mass or less of polyolefin-based resin having a melting point of less than 150° C. in 100% by mass of the entire layer. The amount of the above polyolefin-based resin in the heat seal layer is more preferably 70% by mass or more and 100% by mass or less, and still more preferably 100% by mass in 100% by mass of the entire layer.

The melting point of the polyolefin-based resin used as the main component when the C layer is the heat seal layer is preferably 140° C. or less, more preferably 135° C. or less, and still more preferably 132° C. or less. Note that the melting point of the resin can be read as the temperature of a peak having the largest area among endothermic peaks due to fusion of a DSC curve.

A method for laminating the heat seal layer is not particularly limited, and examples thereof include extrusion lamination and dry lamination in addition to a feedblock method and a multi-manifold method by melt co-extrusion during film formation. From the viewpoint of production efficiency and cost, a lamination method by melt co-extrusion is preferable. The thickness of the heat seal layer of the polypropylene film is not particularly limited, but is preferably 0.3 μm or more and 10 μm or less, the lower limit is preferably 0.5 μm, and more preferably 0.8 μm, and the upper limit is preferably 5.0 μm, and more preferably 3.0 μm.

By setting the lower limit of the thickness of the heat seal layer to 0.3 μm, sufficient heat sealability can be imparted to the polypropylene film according to embodiments of the present invention. In addition, by setting the upper limit of the thickness of the heat seal layer (C layer) to 10 μm, the thicknesses of the layers (specifically, the A layer and the B layer) other than the heat seal layer (C layer) can be sufficiently increased, and it is easy to control the value (strength X) obtained by multiplying the film thickness by the F5 value in the direction perpendicular to the principal orientation axis, to 400 N/m or more and 2000 N/m or less.

In the case where the polypropylene film according to embodiments of the present invention has the A layer and the C layer, the presence or absence of another layer is not particularly limited as long as the polypropylene film has the A layer and the B layer, the A layer is located on one outermost surface, and the C layer is located on the other outermost surface. However, from the viewpoint of production cost and recyclability, a mode in which there is no layer other than the A layer, the B layer, and the C layer, that is, a three-layer configuration of the A layer/the B layer/the C layer or a four-layer configuration of the A layer/the B layer/the A layer/the C layer is preferable, and the three-layer configuration of the A layer/the B layer/the C layer is more preferable. In addition, in the case where the C layer is formed on the polypropylene film having a configuration in which the A layer is located on the outermost surfaces on the opposite sides, a film having the heat seal layer can be separately bonded using an adhesive layer or the like.

The polypropylene film according to embodiments of the present invention can be used in various industrial applications such as packaging films, surface protective films, process films, sanitary articles, agricultural articles, building articles, medical articles, and capacitor films, and can be particularly suitably used in packaging applications because the polypropylene film is excellent in structural stability to heat during vapor deposition, has a favorable water vapor barrier property and oxygen barrier property particularly when the transparent vapor-deposited layer is laminated, and is further stable to heat of heat sterilization treatment. An object to be packaged of the polypropylene film of the present invention is not particularly limited, and examples thereof include those easily deteriorated by water vapor or oxygen, such as food, medicine, cosmetics, detergents, bath agents, and fresh flowers.

<Laminate>

Subsequently, a laminate of the present invention will be described. The laminate according to embodiments of the present invention includes the polypropylene film according to embodiments of the present invention and the layer (D layer) containing a metal and/or an inorganic compound in a total amount of more than 50% by mass and 100% by mass or less. Here, the "layer containing a metal and/or an inorganic compound in an amount of more than 50% by mass" refers to a layer containing only the metal in the amount of more than 50% by mass, a layer containing only the inorganic compound in the amount of more than 50% by mass, and a layer containing both the metal and the inorganic compound in the total amount of more than 50% by mass, when all the components constituting the layer are taken as 100% by mass. As the metal and/or the inorganic compound of the D layer, for example, any of aluminum, aluminum oxide, silicon oxide, cerium oxide, calcium oxide, a diamond-like carbon film, or a mixture thereof is suitably used from the viewpoint of improving the adhesion to the polypropylene film, improving the gas barrier property when laminated on the polypropylene film, and reducing environmental burden.

Here, the D layer is preferably formed on the a-surface formed by the A layer described above. By adopting such a mode, it becomes easy to make the D layer have fewer defects such as pinholes and cracks, and it is possible to achieve a high water vapor barrier property and oxygen barrier property. In addition, a resin layer having a thickness of 1 μm or less may be provided between the D layer and the A layer by coating or the like. By providing such a resin layer, an effect of improving the adhesion between the D layer and the A layer may be obtained. However, from the viewpoint of production cost and recyclability, a mode without the resin layer (that is, a mode in which the D layer is directly laminated on the a-surface formed by the A layer) is preferable.

Examples of a method for forming the D layer on the polypropylene film according to embodiments of the present invention to form the laminate include coating, vapor deposition, and lamination. The vapor deposition is particularly preferable because it is not dependent on humidity and an excellent gas barrier property can be expressed by a thin film. As the vapor deposition method, physical vapor deposition methods such as a vacuum vapor deposition method, an EB vapor deposition method, a sputtering method, and an ion plating method, and various chemical vapor deposition methods such as plasma CVD can be used. The vacuum vapor deposition method is particularly preferably used from the viewpoint of productivity.

In the laminate according to embodiments of the present invention, in a case where the D layer is laminated on the surface layer of the polypropylene film, an adhesion force between the layers is preferably 0.8 N/15 mm or more. The adhesion force is more preferably 1.0 N/15 mm or more, still more preferably 1.2 N/15 mm or more, particularly preferably 1.5 N/15 mm or more, and most preferably 2.0 N/15 mm or more. By adopting such a range, it is possible to reduce natural separation of the polypropylene film and the D layer during bag-forming processing and transportation, and a deterioration in the water vapor barrier property and the oxygen barrier property. Note that a method for setting the adhesion force between the polypropylene film and the D layer to 0.8 N/15 mm or more or within the above preferable range is not particularly limited, and for example, a method in which the adhesion force between them is increased by increasing a nitrogen element composition amount of the surface of the polypropylene film before forming the D layer can be used.

A water vapor transmission rate of the laminate according to embodiments of the present invention is preferably 2.0 $g/m^2/day$ or less from the viewpoint of the preservability of contents when the laminate is used as a packaging material. The water vapor transmission rate is more preferably 1.0 $g/m^2/day$ or less, and still more preferably 0.5 $g/m^2/day$ or less. By adopting such a range, it is possible to reduce a deterioration due to moisture absorption or moisture release of contents particularly when the laminate is used in food packaging applications.

In addition, an oxygen transmission rate of the laminate according to embodiments of the present invention is preferably 20 $cc/m^2/day$ or less from the viewpoint of the preservability of contents when the laminate is used as a packaging material. The oxygen transmission rate is more preferably 2.0 $cc/m^2/day$ or less, still more preferably 1.0 $cc/m^2/day$ or less, and most preferably 0.5 $cc/m^2/day$ or less. By adopting such a range, it is possible to reduce a deterioration due to oxidation of contents particularly when the laminate is used in food packaging applications.

<Packaging Material, Packing Body>

Hereinafter, a packaging material and a packing body according to embodiments of the present invention will be described. The packaging material according to embodiments of the present invention includes at least one of the polypropylene film according to embodiments of the present invention and the laminate according to embodiments of the present invention. The packaging material according to embodiments of the present invention is excellent in structural stability to heat during vapor deposition, and has a favorable water vapor barrier property and oxygen barrier property particularly when the transparent vapor-deposited layer is laminated, so that the packaging material can be suitably used for packaging those easily deteriorated by water vapor or oxygen.

The packing body according to embodiments of the present invention includes contents packed using the packaging material according to embodiments of the present invention. The contents are not particularly limited. Since the packaging material according to embodiments of the present invention is excellent in transparency, water vapor barrier property, and oxygen barrier property, the contents preferably require visibility from the outside, and are easily deteriorated by water vapor or oxygen. Note that the packing body according to embodiments of the present invention is obtained by covering the contents with the packaging material of the present invention, and a mode thereof is not particularly limited. Examples thereof include a packing body obtained by processing the packaging material according to embodiments of the present invention into a bag shape by heat sealing and putting contents into the bag. Specific examples of such a packing body include retort pouch food products.

<Production Method>

Hereinafter, a method for producing the polypropylene film according to embodiments of the present invention will be described. In the production of the polypropylene film according to embodiments of the present invention, first, a molten polypropylene-based resin or polypropylene-based resin composition is melt-extruded onto a support to obtain an unstretched polypropylene film. Subsequently, this unstretched polypropylene film is stretched in the longitudinal direction and then stretched in the width direction to be sequentially biaxially stretched. Thereafter, heat treatment and relaxation treatment are performed to produce a biaxially oriented polypropylene film. Hereinafter, the method will be described more specifically, but the polypropylene film according to embodiments of the present invention and the production method thereof are not necessarily interpreted to be limited thereto.

First, polypropylene-based resins or polypropylene-based resin compositions as raw materials for the A layer and the B layer are melt-extruded from separate single-screw extruders set at an extrusion temperature of 220° C. to 280° C., and preferably 230° C. to 270° C., and are passed through a filtration filter to remove foreign matters and the like. Subsequently, these molten resins are joined by a feedblock or the like so as to have a desired layer configuration (when the A layer in the unstretched stage is defined as an A' layer and the B layer in the unstretched stage is defined as a B' layer, for example, the A' layer/the B' layer, the A' layer/the B' layer/the A' layer, or the like). Thereafter, the obtained molten resin is extruded from a slit-shaped spinneret at a temperature of 200° C. to 260° C., and more preferably 210° C. to 240° C. Here, from the viewpoint that the film structure can be stabilized without being relaxed even at a high temperature by sufficiently melting the resin at the time of melt extrusion and preventing the cutting of the molecular chain due to shearing by screw rotation, it is preferable to adopt such temperature setting as to achieve a multistage temperature decrease in which the temperature before the filtration filter is high, the temperature after passing through the filtration filter is lower than that before the filter, and the spinneret temperature immediately before discharge is still lower.

Next, the molten resin sheet extruded from the slit-shaped spinneret is cooled for solidification on a casting drum (cooling drum) whose surface temperature is controlled to 10° C. to 40° C. to obtain an unstretched polypropylene film. At this time, it is preferable to perform co-extrusion lamination such that the surface side on which the molten sheet extruded from the spinneret first comes into contact with the drum becomes the A layer because the degree of crystallinity of the A layer and its orientation parameter can be easily controlled within a desired range. As a method for bringing the molten sheet into close contact with the casting drum, any of an electrostatic application method, an adhesion method using the surface tension of water, an air knife method, a press roll method, an underwater casting method, an air chamber method, and the like may be used, or a plurality of methods may be combined. An air knife method capable of obtaining favorable film flatness and capable of controlling surface roughness is preferable. In addition, in the case of using the air knife method, it is preferable to appropriately adjust the position of the air knife so that the air flows to the downstream side of film formation in order not to cause vibration of the film.

From the viewpoint of smoothing the surface of the obtained polypropylene film and improving the thickness uniformity and adhesion of the D layer formed by the vapor-deposited film or the like, it is preferable that the surface temperature of the casting drum is preferably 10° C. to 35° C., more preferably 10° C. to 30° C., and most preferably 10° C. to 25° C., and the resin to be the A layer after stretching is on the drum surface (surface in contact with the casting drum) side. By adopting such a temperature range and configuration, it is possible to increase the mesomorphic phase fraction of a surface layer portion particularly on the drum surface side (surface side to be the A layer after stretching) of the unstretched polypropylene film, so that the unstretched polypropylene film can have a mesomorphic phase structure.

The mesomorphic phase is an intermediate phase between a crystal and an amorphous phase, and is specifically produced in solidification at a very high cooling rate from a molten state. It is generally known that spherulites grow when a polypropylene is cooled and solidified into crystals. It is believed that when an unstretched polypropylene film having the spherulites is stretched, a difference in stretching stress is produced between the crystal portion and the amorphous portion inside the spherulites and between the spherulites, which produces local stretching unevenness, leading to thickness unevenness and structure unevenness. On the other hand, since the mesomorphic phase does not take a spherulite form, stretching unevenness does not occur, and stretching uniformity is enhanced, so that thickness uniformity becomes high, and surface roughness is small and easily becomes uniform when the mesomorphic phase is formed into a film. In addition, in a case where the unstretched film does not have a spherulite structure, the stretching (longitudinal stretching) temperature in the longitudinal direction can be made lower than that of the unstretched polypropylene film having spherulites.

Particularly in the laminated polypropylene film including the A layer containing the polypropylene-based resin having high stereoregularity and the B layer containing the polypropylene-based resin and the petroleum resin, the stretchability of the highly-stereoregular polypropylene, which is difficult to stretch at a low temperature, can be enhanced by using the A layer having the mesomorphic phase. Therefore, even when the stretching temperature in the longitudinal direction is set to a low temperature of 124° C. or less, the film formability can be improved, the orientation of the A layer can be enhanced, and the A layer surface of the finally obtained polypropylene film can be made smooth. The mesomorphic phase fraction of the polypropylene-based resin contained in the surface layer portion to be the A layer after stretching the unstretched film is preferably 20% or more, more preferably 40% or more, still more preferably 60% or more, particularly preferably 80% or more, and most preferably 90% or more. The upper limit is not particularly limited, but is practically 99%.

Next, the unstretched polypropylene film is biaxially stretched to be biaxially oriented. First, the unstretched polypropylene film is preheated while being passed between rolls, the lower limit of which is preferably 70° C., and more preferably 80° C., and the upper limit of which is preferably 124° C. or more, more preferably 120° C., and still more preferably 110° C. Subsequently, the unstretched polypropylene film is maintained in a temperature range in which the lower limit is preferably 70° C., more preferably 80° C., and the upper limit is preferably 124° C. or more, more preferably 120° C., and still more preferably 110° C., longitudinally stretched with the lower limit of the stretching ratio in the longitudinal direction set to 2.0 times, preferably 4.0 times, more preferably 4.5 times, and the upper limit set to 15 times, preferably 10 times, more preferably 8.0 times, and still more preferably 6.0 times, and then cooled to room temperature to obtain a uniaxially oriented film.

Subsequently, the uniaxially oriented film is guided to a tenter with the end of the film being grasped with a clip, and stretched in the width direction (laterally stretched) with the end of the film being grasped with the clip. The lower limit of the temperature (the stretching temperature in the width direction) at this time is 150° C., and preferably 155° C., and the upper limit is 170° C., and preferably 165° C. In addition, the lower limit of the stretching ratio in the width direction is 7.0 times, preferably 8.0 times, and more preferably 8.5 times, and the upper limit is 20 times, preferably 16 times, and more preferably 12 times. By setting the stretching ratio in the width direction to 7.0 times or more, it is possible to impart high orientation in the width direction as well while maintaining a high orientation state in the longitudinal direction, and to increase molecular chain tension in the surface. Therefore, particularly when the film is used in packaging applications, the structural stability of the film to heat during vapor deposition can be enhanced, and a uniform vapor-deposited film can be formed, so that a favorable water vapor barrier property and oxygen barrier property can be obtained. In addition, by setting the stretching ratio in the width direction to 20 times or less, it is possible to prevent film breakage during film formation, and to improve productivity.

In addition, in the production of the propylene film according to embodiments of the present invention, an area stretching ratio is preferably set to 40 times or more and 100 times or less. The area stretching ratio can be obtained by multiplying the stretching ratio in the longitudinal direction by the stretching ratio in the width direction. The lower limit of the area stretching ratio is more preferably 45 times, and still more preferably 50 times.

In the production of the polypropylene film according to embodiments of the present invention, heat treatment and relaxation treatment are preferably performed after the lateral stretching. The heat treatment and the relaxation treatment are performed while relaxing the film by 2% or more and 20% or less in the width direction with the opposite ends in the width direction being tightly grasped with the clips of the tenter. The lower limit of the temperature during the heat treatment is 155° C., preferably 160° C., and more preferably 165° C., and the upper limit is 177° C., preferably 175° C., and more preferably 173° C. By performing such heat treatment and relaxation treatment, it is possible to improve the structural stability of the film to heat without deteriorating the smoothness of the film surface, and to inhibit a heat defect phenomenon in which defects such as pinholes and cracks are generated in the D layer when the D layer is formed by vapor deposition to form the laminate. As a result, the water vapor barrier property and the oxygen barrier property of the laminate obtained from the polypropylene film can be improved.

In the relaxation treatment, the relaxation ratio is preferably 2% or more and 20% or less from the viewpoint of enhancing the structural stability of the film to heat. From the above viewpoint, the lower limit is preferably 5%, more preferably 7%, still more preferably 8%, particularly preferably 9%, and most preferably 11%, and the upper limit is preferably 18%, more preferably 17%, and still more preferably 16%. In a case where the relaxation ratio is less than 2%, it may be difficult to set the thermal shrinkage percentage measured by the thermomechanical analysis (TMA) to $|S_{MD,100° C.} - S_{MD,130° C.}| \leq 2.00$ and $|S_{TD,100° C.} - S_{TD,130° C.}| \leq 2.50$. Therefore, when the D layer is formed by vapor deposition to form the laminate, the film may be deformed to generate defects such as pinholes and cracks in the D layer, resulting in a deterioration of the water vapor barrier property and the oxygen barrier property of the laminate in which the D layer is laminated. On the other hand, in a case where the relaxation ratio exceeds 20%, the film becomes excessively slack inside the tenter, resulting in wrinkles in the film after film formation, which may lead to a deterioration in mechanical characteristics and unevenness during vapor deposition.

After the above heat treatment, the film is guided to the outside of the tenter, the clips at the opposite ends in the width direction of the film are released in a room temperature atmosphere, and the film edge is slit in a winder process. Thereafter, it is preferable to perform corona discharge treatment or plasma treatment on a surface to be subjected to vapor deposition treatment at the time of use (usually, the surface of the A layer) in the air or in an atmosphere gas of oxygen, nitrogen, hydrogen, argon, carbon dioxide gas, silane gas, or a mixture thereof for the purpose of improving the adhesion of the vapor-deposited layer. Among them, it is particularly preferable to perform the treatment in nitrogen or a mixture gas of nitrogen and carbon dioxide gas because a functional group contributing to the adhesion can be efficiently introduced to the surface to be subjected to vapor deposition treatment. The polypropylene film according to embodiments of the present invention thus obtained can be wound into a roll to obtain a final product roll.

EXAMPLES

Hereinafter, the present invention will be described in more detail with reference to examples, but the present invention is not limited to modes described below. Note that each item was evaluated with the following method.

<Methods for Measuring Characteristic Values, Methods for Evaluating Effects>

Methods for measuring characteristic values and methods for evaluating effects in the present invention are as follows.

(1) F5 Value in Direction Perpendicular to Principal Orientation Axis

<Method for Determining Principal Orientation Axis of Film>

First, a method for determining the principal orientation axis of the polypropylene film will be described. A polypropylene film was prepared and cut into a rectangle having a length of 50 mm and a width of 10 mm with an optional direction directed upward to obtain a sample <1>. At this time, a direction in which the long side of the rectangular sample <1> was directed was defined as 0°. Next, a sample <2> having the same size was collected such that the long side direction was directed in a direction rotated rightward by 150 from the 0° direction. Subsequently, samples <3> to <12> were collected in the same manner by similarly rotating the long side direction of the rectangular sample by 15° each. Next, each rectangular sample was set in a tensile tester ("Tensilon" (registered trademark) UCT-100 manufactured by ORIENTEC CORPORATION) at an initial chuck-to-chuck distance of 20 mm such that the long side direction was a tensile direction, and a tensile test was carried out at a tensile speed of 300 mm/min in an atmosphere of 23° C. and 65% RH. At this time, the maximum load until the sample was broken was read, and the value obtained by dividing the maximum load by the cross-sectional area (film thickness×width) of the sample before the test was calculated as the stress of the maximum point strength. The same measurement was performed 5 times for each sample to obtain the average value of the stresses of the maximum point strengths. The long side direction of the sample with the largest average value was defined as the principal orientation axis of the polypropylene film, and the direction perpendicular thereto was defined as the direction perpendicular to the principal orientation axis of the polypropylene film.

<Method for Determining F5 Value in Direction Perpendicular to Principal Orientation Axis>

A rectangular polypropylene film or laminate (width (short side) 10 mm×length (long side) 150 mm) cut out along the direction perpendicular to the principal orientation axis determined as described above as the long side direction was used as a measurement sample. Next, the sample was set in a tensile tester ("Tensilon" (registered trademark) UCT-100 manufactured by ORIENTEC CORPORATION) at an initial chuck-to-chuck distance of 20 mm, and a tensile test of the film was carried out at a tensile speed of 300 mm/min under an environment in an atmosphere of 23° C. and 65% RH. At this time, the position of the sample in the long side direction was adjusted so that the center of the sample was in the vicinity of the center between the chucks. In addition, a load applied to the film at 5% elongation of the sample was read, and the value obtained by dividing the load by the cross-sectional area (film thickness×width (10 mm)) of the sample before the test was calculated as the stress at 5% elongation (F5 value, unit: MPa). The measurement was performed 5 times, and the F5 value in the direction perpendicular to the principal orientation axis was obtained as the arithmetic average value.

(2) Polypropylene Film Thickness

The thickness of the polypropylene film was measured at 10 optional positions in an atmosphere of 23° C. and 65% RH using a contact-type electronic micrometer (K-312A type) manufactured by ANRITSU CORPORATION. The arithmetic average value of the thicknesses at the 10 positions was taken as the thickness (unit: μm) of the polypropylene film.

(3) Strength X of Film

The strength X (unit: N/m) of the film was calculated by multiplying the film thickness (unit: μm) measured in (2) by the F5 value (unit: MPa) in the direction perpendicular to the principal orientation axis of the film measured in (1).

(4) $|S_{MD,100°\ C.}-S_{MD,130°\ C.}|$ and $|S_{TD,100°\ C.}-S_{TD,130°\ C.}|$

<Measurement of Thermal Shrinkage Percentage by Thermomechanical Analysis (TMA)>

The polypropylene film was cut into rectangular samples having a width of 4 mm and a length of 50 mm along each of "the direction perpendicular to the principal orientation axis of the film" and "the direction of the principal orientation axis of the film" measured and determined in (1) as the long side, and held between metal chucks of a thermomechanical analyzer described below so as to have a test length of 20 mm. Thereafter, heat shrinkage curves in the direction perpendicular to the principal orientation axis and the direction of the principal orientation axis in the films whose test length was kept constant were obtained under the following temperature conditions and load conditions.

(Apparatus)
　Apparatus: TMA/SS 6000 (manufactured by Seiko Instruments Inc.)

(Temperature Conditions)
　Initial temperature: 25° C., maximum temperature: 180° C., rate: 10° C./min
　Hold: 10 minutes
　Sampling time: 10 S/time
　Nitrogen cooling: None (Load Conditions)
　Control mode: F
　Upper limit load during standby: 19.6 mN
　Initial load: 19.6 mN
　Load rate: 0.1 mN/min
　Hold: 600 minutes.

<Calculation of $|S_{MD,100°\ C.}-S_{MD,130°\ C.}|$ and $|S_{TD,100°\ C.}-S_{TD,130°\ C.}|$>

$|S_{MD,100°\ C.}-S_{MD,130°\ C.}|$ and $|S_{TD,100°\ C.}-S_{TD,130°\ C.}|$ were obtained by reading the following numerical values from the thermal shrinkage curves obtained by the above-described measurement method and substituting the read numerical values into a mathematical formula.

$S_{MD,100°\ C.}$: Thermal shrinkage percentage (%) at 100° C. in the direction perpendicular to the principal orientation axis of the film
　$S_{MD,130°\ C.}$: Thermal shrinkage percentage (%) at 130° C. in the direction perpendicular to the principal orientation axis of the film
　$S_{TD,100°\ C.}$: Thermal shrinkage percentage (%) at 100° C. in the direction of the principal orientation axis of the film
　$S_{TD,130°\ C.}$: Thermal shrinkage percentage (%) at 130° C. in the direction of the principal orientation axis of the film.

(5) Surface Roughness Sku and Sa

The measurement of the surface roughness Sku and Sa was performed using a scanning white-light interference microscope VS1540 of Hitachi High-Tech Science Corporation, which is a three-dimensional non-contact surface shape measuring instrument. In addition, in analysis, the undulation component was removed from a shot image by polynomial fourth-order approximation surface correction with the use of attached analysis software, the image was processed with a median (3×3) filter, and interpolation processing (processing of compensating for pixels for which height data failed to be acquired, with height data calculated from surrounding pixels) was then performed. The measurement conditions were as follows.

Manufacturer: Hitachi High-Tech Science Corporation
　Apparatus name: Scanning white-light interference microscope VS1540
　Measurement conditions: Objective lens 10×
　Lens barrel 1×
　Zoom lens 1×
　Wavelength filter 530 nm white
　Measurement mode: Wave
　Measurement software: VS-Measure Version10.0.4.0
　Analysis software: VS-Viewer Version10.0.3.0
　Measurement area: 0.561×0.561 mm².

(6) Surface Free Energy

Four kinds of liquids of water, ethylene glycol, formamide, and methylene iodide were used as measurement liquids, and the static contact angle of each liquid with respect to the film surface was obtained using a contact angle meter CA-D type manufactured by Kyowa Interface Science Co., Ltd. Note that the static contact angle was measured 30 seconds after dropping each liquid on the film surface. The contact angle obtained for each liquid and the components of the surface tension of the measurement liquid were substituted into the following equations, and the simultaneous equations composed of four equations were solved for γSd, γSp, and γSh.

$$(\gamma Sd \cdot \gamma Ld)^{1/2}+(\gamma Sp \cdot \gamma Lp)^{1/2}+(\gamma Sh \cdot \gamma Lh)$$

$$1/2=\gamma L(1+\cos\theta)/2$$

where $\gamma S=\gamma Sd+\gamma Sp+\gamma Sh$ $$\gamma L=\gamma Ld+\gamma Lp+\gamma Lh$$

γS, γSd, γSp, and γSh respectively represent the surface free energy, the dispersive force component, the polar force component, and the hydrogen bonding component of the film surface, and γL, γLd, γLp, and γLh respectively represent the surface free energy, the dispersive force component, the polar force component, and the hydrogen bonding component of the measurement liquid used. Here, as the surface tension of each liquid used, the value proposed by Panzer (J. Panzer, J. Colloid Interface Sci., 44, 142 (1973) was used.

(7) Half Bandwidth Around 400 cm$^{-1}$ of a-Surface

The half bandwidth around 400 cm$^{-1}$ of the a-surface was quantified by micro-Raman measurement. First, a cross section including the direction perpendicular to the principal orientation axis of the film determined by the method described in (1) and the thickness direction of the film was prepared from the polypropylene film. The cross section was prepared by being embedded in a bisphenol epoxy resin (Epo-Mount main agent 27-771, Epo-Mount curing agent 27-772 manufactured by Refine Tec Ltd.), cured for 24 hours, and then cut out with a microtome. Next, linearly polarized light was incident on a portion of the cross section including the outermost surface (a-surface) having a smaller sharpness Sku measured in (5), and only a component parallel to the incident light in the obtained scattered light was detected to acquire a polarized Raman spectrum. However, in order to eliminate the anisotropy of a spectrometer, a λ/4 wave plate was installed after an analyzer/before a grating, and the scattered light in a state in which the polarization state was eliminated was introduced into the grating. By using the obtained sample cross section, a Raman spectrum was obtained in which the vertical axis was intensity (unit: a.u.) and the horizontal axis was Raman shift (unit: cm$^{-1}$) with respect to CH bending vibration under circular polarization conditions (anisotropy elimination conditions), and the half bandwidth (unit: cm$^{-1}$) around 400 cm$^{-1}$ of the spectrum was quantified. Note that the baseline was set to 370 cm$^{-1}$-430 cm$^{-1}$, the number N of measurements was set to N=3, and the average value thereof was adopted as the half bandwidth around 400 cm$^{-1}$ on the a-surface. Details of the measurement conditions will be described below. (Details of measurement conditions)

Measuring apparatus: in Via (RENISHAW)
Light source: 532 nm (YAG 2nd)
Laser power: 10 mW at sample
Beam diameter: 1 μm
Objective lens: 100 times (N.A.=0.85)
Diffraction grating: 3000 gr (first-order diffraction)
Slit: 65 μm
Detector: CCD/RENISHAW 1024×256
Number N of measurements: N=3
Fitting conditions: 3 components 810 cm$^{-1}$/835 cm$^{-1}$/840 cm$^{-1}$
Function used: Lorentz function
Processing method: The half bandwidth of only the 835 cm$^{-1}$ band was fixed to 10 cm$^{-1}$
Baseline: 770 cm$^{-1}$-880 cm$^{-1}$.

(8) Melting Point and Degree of Crystallinity of Polypropylene-Based Resin

Chips of the polypropylene-based resin used as the raw material were used as a sample. With the use of a differential scanning calorimeter (EXSTAR DSC6220 manufactured by Seiko Instruments Inc.), 3 mg of the sample was heated in a nitrogen atmosphere from 30° C. to 260° C. at a temperature rising speed of 20° C./min. Subsequently, the sample was held at 260° C. for 5 minutes, and then cooled down to 30° C. under the condition of 20° C./min. The sample was further held at 30° C. for 5 minutes, and heated again from 30° C. to 260° C. under the condition of 20° C./min. The peak temperature of an endothermic curve obtained at the time of heating the sample again was set as the melting point of the polypropylene resin. In a case where a plurality of peak temperatures can be observed, the highest temperature was set as the melting point of the polypropylene resin. In addition, the fusion enthalpy ΔHm was read from the endothermic peak in a temperature region of 100° C. or more and 180° C. or less in this curve, and divided by a theoretical value (209 J/g) in a perfect crystal of polypropylene to calculate the degree of crystallinity (%) of the polypropylene-based resin.

Degree of crystallinity (%) of polypropylene-based resin=100×ΔHm/209 where ΔHm is fusion enthalpy (J/g).

(9) Degree of Crystallinity of Resin Compositions of a Layer and B Layer

In the same manner as in (8), the resin compositions of the A layer and the B layer of the polypropylene film were measured by differential scanning calorimetry (DSC) from 30° C. to 260° C. at a temperature rising speed of 20° C./min, and the fusion enthalpy ΔHm was read from the endothermic peak in a temperature region of 100° C. or more and 180° C. or less in the resulting curve of the 2nd Run, and divided by a theoretical value (209 J/g) in a perfect crystal of polypropylene to calculate the degree of crystallinity (%) of the resin compositions of the A layer and the B layer.

Degree of crystallinity (%) of resin compositions of A layer and B layer=100×ΔHm/209 where ΔHm is fusion enthalpy (J/g).

(10) Molecular Weight Distribution (Mz/Mn) of Polypropylene-Based Resin, Differential Distribution Value when Logarithmic Molecular Weight Log (M)=6.5

Evaluation and calculation were performed by gel permeation chromatography (GPC) using the following apparatus and measurement conditions. As sample pretreatment, a sample was weighed under the following measurement conditions, a solvent (1,2,4-TCB to which 0.1% of BHT was added) was added, and the mixture was shaken at 140° C. for 1 hour to dissolve the sample. Next, heat filtration was performed with a sintered filter having a pore size of 0.5 μm to perform fractionation by molecular size. From the molecular weight distribution curve of the sample component contained in the filtrate, the differential distribution value when the logarithmic molecular weight Log (M) was 6.5 was read.

<Apparatus and Measurement Conditions>
Apparatus: HLC-8321GPC/HT (detector: RT)
Column: TSKgel guardcolumn H$_{HR}$(30) HT (7.5 mm I.D.×7.5 mm)×1 bottle+TSKgel GMH$_{HR}$-H(20) HT (7.8 mm I.D.×30 cm) (manufactured by Tosoh Corporation)×3 bottles
Eluent: 1,2,4-Trichlorobenzene (for GPC manufactured by FUJIFILM Wako Pure Chemical Corporation)+BHT (0.05%)
Flow rate: 1.0 mL/min.
Detection conditions: polarity=(−)
Injection amount: 0.3 mL
Column temperature: 140° C.
System temperature: 40° C.
Sample concentration: 1 mg/mL A calibration curve was produced using standard polystyrene (manufactured by Tosoh Corporation), and the value of the measured molecular weight was converted into the value of polystyrene to obtain a Z average molecular weight (Mz) and a number average molecular weight (Mn). Then, the molecular weight distribution (Mz/Mn) was calculated using the values of Mz and Mn.

(11) Water Vapor Barrier Property after Al Vapor Deposition or after AlOx Vapor Deposition <Al Vapor Deposition Method>

A film roll was set in a vacuum vapor deposition apparatus equipped with a film traveling device, and brought into a high pressure reduction state of $1.00 \times 10^{-2}$ Pa. Thereafter, the film was caused to travel through a cooling metal drum at 20° C., and aluminum metal was heated and evaporated to form a vapor-deposited thin-film layer on the A layer. At this time, the vapor-deposited film was controlled to have a thickness of 100 nm. After the vapor deposition, the inside of the vacuum vapor deposition apparatus was returned to normal pressure, the wound film was rewound, and aged at a temperature of 40° C. for 2 days to obtain a laminate in which the vapor-deposited layer of Al (aluminum) was laminated on the film.

<AlOx Vapor Deposition Method>

A film roll was set in a vacuum vapor deposition apparatus equipped with a film traveling device, and brought into a high pressure reduction state of $1.00 \times 10^{-2}$ Pa. Thereafter, the film was caused to travel through a cooling metal drum at 20° C., and AlOx was reacted and evaporated while introducing an oxygen gas to form a vapor-deposited layer on the A layer. At this time, the vapor-deposited film was controlled to have a thickness of 20 nm. After the vapor deposition, the inside of the vacuum vapor deposition apparatus was returned to normal pressure, the wound film was rewound, and aged at a temperature of 40° C. for 2 days to obtain a laminate in which the vapor-deposited layer of AlOx (aluminum oxide) was laminated on the polypropylene film.

<Method for Evaluating Water Vapor Barrier Property>

The laminate obtained through the Al vapor deposition or the AlOx vapor deposition was measured under the conditions of a temperature of 40° C. and a humidity of 90% RH using a water vapor transmission rate measuring apparatus "PERMATRAN-W" (registered trademark) 3/30 manufactured by MOCON/Modern Controls, Inc. The measurement was performed 5 times per sample, and the average value of the obtained values was calculated and taken as the water vapor transmission rate of the film (unit: g/m²/day). From the obtained water vapor transmission rate, the water vapor barrier property of the laminate was determined according to the following criteria. B or more was regarded as a good water vapor barrier property, and C was regarded as a practically acceptable level.

A: 0.5 g/m²/day or less.
B: More than 0.5 g/m²/day and 1.0 g/m²/day or less.
C: More than 1.0 g/m²/day and 2.0 g/m²/day or less.
D: More than 2.0 g/m²/day.

(12) Oxygen Barrier Property after Al Vapor Deposition or after AlOx Vapor Deposition The laminate in which the Al vapor-deposited layer or the AlOx vapor-deposited layer was laminated was obtained by the method described in (11). For each laminate, the oxygen transmission rate was measured under the conditions of a temperature of 23° C. and a humidity of 0% RH using an oxygen transmission rate measuring apparatus "OX-TRAN" (registered trademark) 2/20 manufactured by MOCON/Modern Controls, Inc. The measurement was performed 5 times per sample, and the average value of the obtained values was calculated and taken as the oxygen transmission rate of the film (unit: cc/m²/day). From the obtained oxygen transmission rate, the oxygen barrier property of the laminate was determined according to the following criteria. B or more was regarded as a good oxygen barrier property, and C was regarded as a practically acceptable level.

A: 0.5 cc/m²/day or less.
B: More than 0.5 cc/m²/day and 1.0 cc/m²/day or less.
C: More than 1.0 cc/m²/day and 2.0 cc/m²/day or less.
D: More than 2.0 cc/m²/day or less.

(13) Barrier Stability

The laminate in which the Al vapor-deposited layer or the AlOx vapor-deposited layer was laminated was obtained by the method described in (11). For each laminate, two samples cut out into a size of 10 cm×10 cm were prepared, overlaid so that the different surfaces of the laminates were in contact with each other, and pressed at a pressure of 10 kg/cm² for 10 seconds. After that, the oxygen transmission rate of the sample pressed with the vapor-deposited layer in contact with the back surface layer of the other sample was measured by the method described in (12). The oxygen transmission rate of the obtained pressed product was defined as $P_{O2,after}$, the oxygen transmission rate of the case of not performing the pressing was defined as $P_{O2,before}$, and the barrier stability was determined according to the following criteria. B or more was regarded as good barrier stability, and C was regarded as a practically acceptable level.

A: $P_{O2,after}/P_{O2,before}$ being 1.2 or less
B: $P_{O2,after}/P_{O2,before}$ being more than 1.2 and 2.0 or less
C: $P_{O2,after}/P_{O2,before}$ being more than 2.0 and 3.0 or less
D: $P_{O2,after}/P_{O2,before}$ being more than 3.0

Note that the pressing here is for accelerating and evaluating a phenomenon in which when the laminate is stored in a state of being wound up as a roll for a long period of time of 1 month or more, the vapor-deposited layer is physically damaged due to winding and tightening of the roll, and the barrier property is deteriorated due to the occurrence of defects such as pinholes and cracks.

(14) Handleability

First, the coefficient of static friction (μs) of the laminate of the present invention was measured at 25° C. and 65% RH according to JIS K 7125 (1999) using a slip tester manufactured by Toyo Seiki Seisaku-sho, Ltd. Note that the measurement was performed in such a manner that the longitudinal directions and the different surfaces of the laminates, that is, the vapor-deposited surface and the opposite surface were overlaid on each other. The same measurement was performed 5 times per sample, and the average value of the obtained values was calculated and taken as the coefficient of static friction (μs) of the sample. The handleability was determined according to the following criteria. B or more was regarded as good handleability, and C was regarded as a practically acceptable level.

A: μs being 0.5 or less
B: μs being more than 0.5 and 0.7 or less
C: μs being more than 0.7 and 0.9 or less
D: μs being more than 0.9.

<Components Used for Production of Polypropylene Films of Examples and Comparative Examples>

The following components were used for the production of polypropylene films of Examples and Comparative examples.

(Polypropylene-Based Resin for a Layer)

A1: Homopolypropylene-based resin (meso-pentad fraction: 0.97, melting point: 167° C., MFR: 3.0 g/10 min)
A2: Homopolypropylene-based resin (meso-pentad fraction: 0.96, melting point: 166° C., MFR: 8.0 g/10 min)
A3: Homopolypropylene-based resin (meso-pentad fraction: 0.95, melting point: 164° C., MFR: 2.5 g/10 min)
A4: Homopolypropylene-based resin (meso-pentad fraction: 0.93, melting point: 162° C., MFR: 3.0 g/10 min)

A5: Ethylene-propylene random copolymer (melting point: 135° C., MFR: 7.0 g/10 min, propylene content 96.0%)

A6: Maleic acid-modified polypropylene "Admer" (registered trademark) QF500A (melting point: 165° C., MFR: 3.0 g/10 min) manufactured by Mitsui Chemicals, Inc.

A7: Ethylene-propylene random copolymer (melting point: 160° C., MFR: 2.0 g/10 min, propylene content 99.0%)

A8: Homopolypropylene-based resin (melting point: 155° C., MFR: 3.0 g/10 min)

A9: Homopolypropylene-based resin (meso-pentad fraction: 0.97, melting point: 167° C., MFR: 2.6 g/10 min)

A10: Homopolypropylene-based resin (meso-pentad fraction: 0.90, melting point: 161° C., MFR: 3.0 g/10 min)

A11: Ethylene-propylene random copolymer (melting point: 152° C., MFR: 3.0 g/10 min, propylene content 96.5%).

(Polypropylene-Based Resin for B Layer)

B1: Polypropylene-based resin (melting point: 165° C., MFR: 3.0 g/10 min, differential distribution value when Log (M)=6.5:7.1)

B2: Ethylene-propylene random copolymer (melting point: 146° C., MFR: 3.0 g/10 min, propylene content 97.0%, differential distribution value when Log (M)=6.5:9.3)

B3: Polypropylene-based resin (melting point: 161° C., MFR: 3.0 g/10 min, differential distribution value when Log (M)=6.5:9.7)

B4: Polypropylene-based resin (melting point: 167° C., MFR: 2.6 g/10 min, differential distribution value when Log (M)=6.5:9.3)

B5: Polypropylene-based resin (melting point: 165° C., MFR: 2.0 g/10 min, differential distribution value when Log (M)=6.5:8.9)

B6: Polypropylene-based resin (melting point: 164° C., MFR=4.0 g/10 min, differential distribution value when Log (M)=6.5:1.0)

B7: Polypropylene-based resin (melting point: 162° C., MFR=3.0 g/10 min, differential distribution value when Log (M)=6.5:12.0)

B8: Polypropylene-based resin (melting point: 150° C., MFR=3.5 g/10 min, differential distribution value when Log (M)=6.5:8.4).

(Polypropylene-Based Resin for C Layer)

C1: Ethylene-propylene random copolymer (melting point: 130° C.)

C2: Polypropylene-based resin (melting point: 166° C., MFR: 3.5 g/10 min).

(Master Batch and Resin Other than Polypropylene-Based Resin)

Petroleum resin 1: T-REZ HA125 (manufactured by JXTG Energy Corporation, softening point 125° C.)

Petroleum resin 2: ARKON P125 (manufactured by Arakawa Chemical Industries, Ltd., softening point 125° C.)

Petroleum resin 3: T-REZ HA085 (manufactured by JXTG Energy Corporation, softening point 85° C.)

Polymethylpentene-based resin 1: "TPX" (registered trademark) (MX004, melting point 228° C., MFR=25 g/10 min @260° C.) manufactured by Mitsui Chemicals, Inc.

M1: Masterbatch prepared by kneading and extruding B1 (70 parts by mass), petroleum resin 1 (30 parts by mass), and an antioxidant (0.1 parts by mass) with an extruder set at 240° C., then cooling the strand with water, and forming the strand into chips.

M2: Petroleum resin masterbatch obtained by melting and kneading B5 and petroleum resin 2 at a mass ratio of 1:1.

M3: Masterbatch prepared by kneading and extruding B1 (70 parts by mass), petroleum resin 3 (30 parts by mass), and an antioxidant (0.1 parts by mass) with an extruder set at 240° C., then cooling the strand with water, and forming the strand into chips.

M4: Masterbatch prepared by kneading and extruding A2 (50 parts by mass), polymethylpentene-based resin 1 (50 parts by mass), and an antioxidant (0.1 parts by mass) with an extruder set at 260° C., then cooling the strand with water, and forming the strand into chips.

(Particles, Additives, Etc.)

P1: Crosslinked particles of a polymethacrylic acid-based polymer having an average particle diameter of 2 μm P2: Silica particles (SFP-20MHE (silane coupling surface treatment) manufactured by Denki Kagaku Kogyo Co., Ltd.) (average particle diameter: 0.3 μm)

R1: Nonitol-based melt-type nucleating agent (α-crystal nucleating agent NX8000 (manufactured by Milliken & Company)).

Example 1

As the raw material for the A layer, a mixture of A1 and A2 at a mass ratio of 70:30 was used. In addition, as the raw material for the B layer, a mixture of B1 and M1 at a mass ratio of 75:25 was used. These raw materials were individually supplied to separate single-screw extruders and melt-extruded at 240° C., and foreign matters were removed with an 80 μm cut sintered filter. After that, the extrusion amount was adjusted with a feedblock so as to obtain a lamination ratio of 1/13/1 in the three-layer lamination of A/B/A, and the obtained molten laminated polymer was discharged from a T-die. Thereafter, the discharged molten sheet was cooled for solidification in close contact on a casting drum held at 20° C. by an air knife to obtain an unstretched film.

Next, this unstretched polypropylene film was preheated to 105° C. stepwise by a plurality of roll groups, passed between rolls having a circumferential speed difference as it was, and stretched 5.0 times in the longitudinal direction to obtain a uniaxially oriented film. Furthermore, the obtained uniaxially oriented film was guided to a tenter, stretched 10 times in the width direction at 170° C. with the opposite ends in the film width direction being grasped with clips, and then heat-treated at 165° C. while being relaxed by 10% in the width direction. Thereafter, the film was guided to the outside of the tenter, and the clips at the opposite ends in the film width direction were released. Subsequently, the film surface (surface side in contact with the casting drum) was subjected to the corona discharge treatment at a treatment intensity of 25 W·min/m$^2$ in a mixed gas atmosphere of carbon dioxide gas and nitrogen gas adjusted to have a carbon dioxide gas concentration ratio of 15 vol %, so that the surface free energy of the a-surface was 38 mN/m. Finally, the biaxially oriented polypropylene film thus obtained having a thickness of 15 μm was wound up as a roll. The characteristics of the obtained biaxially oriented polypropylene film are shown in Table 1-1. Note that this Example is a mode in which the top layers on the opposite sides are the A layers (mode in which the resin components constituting the top layers on the opposite sides both have a fraction of the propylene unit of 97.0 mol % or more and 100.0 mol % or less, which is larger than the fraction of the propylene unit of the resin component constituting the entire polypropylene film), and the Sku value of the A layer having a smaller Sku value of the surface (in this Example, the A layer on the side in contact with the casting drum during film formation) is described in Table 1-1. In addition, the vapor-deposited layer was provided on the A layer having a smaller Sku value (that is, the a-surface). The same applies to the following Examples and Comparative Examples.

Examples 2 to 6

The biaxially oriented polypropylene film was produced in the same manner as in Example 1 except that the film formation conditions and the raw materials for the respective layers were changed as shown in Table 1-1. The characteristics of the obtained biaxially oriented polypropylene film are shown in Table 1-1.

Example 7

As the raw materials for the A layer and the B layer, the same materials as in Example 1 were used. Furthermore, C1 was used as the raw material for the C layer. These materials were individually supplied to separate single-screw extruders, melt-extruded at 240° C., and foreign matters were removed with an 80 μm cut sintered filter. Thereafter, the extrusion amount was adjusted with a feedblock so as to obtain a lamination thickness ratio of 1/13/1 in the three-layer lamination of A/B/C, and the obtained molten sheet was discharged from a T-die. The biaxially oriented polypropylene film was obtained in the same manner as in Example 1 in subsequent steps except that the film formation conditions were changed as shown in Table 1-1. Note that the vapor-deposited layer was provided on the A layer. The characteristics of the obtained biaxially oriented polypropylene film are shown in Table 1-1.

Example 8

The biaxially oriented polypropylene film was produced in the same manner as in Example 1 except that a single-layer configuration having only the A layer was adopted by using a mixture of A3 and A2 at a mass ratio of 70:30 as the raw material for the A layer, and the film formation conditions were changed as shown in Table 1-1. The characteristics of the obtained biaxially oriented polypropylene film are shown in Table 1-1.

Examples 9 to 13, 16

The biaxially oriented polypropylene film was produced in the same manner as in Example 1 except that the film formation conditions and the raw materials for the respective layers were changed as shown in Table 1-2. The characteristics of the obtained biaxially oriented polypropylene film are shown in Table 1-2.

Examples 14, 15, 17, and 18

The biaxially oriented polypropylene film was produced in the same manner as in Example 7 except that the film formation conditions and the raw materials for the respective layers were changed as shown in Table 1-2. The characteristics of the obtained biaxially oriented polypropylene film are shown in Table 1-2.

Comparative Example 1

As the raw material for the A layer, a material obtained by mixing A9 and P2 at 99.9:0.1 (mass ratio), kneading and extruding the mixture with an extruder set at 240° C., cooling the strand with water, and then forming the strand into chips was used. In addition, as the raw material for the B layer, a material obtained by kneading and extruding B4 and R1 at 99.7:0.3 (mass ratio) with an extruder set at 240° C., cooling the strand with water, and then forming the strand into chips was used. The raw materials for the A layer and the B layer were individually supplied to separate single-screw extruders, melt-extruded at 240° C., and foreign matters were removed with an 80 μm cut sintered filter. After that, the extrusion amount was adjusted with a feedblock so as to obtain a lamination thickness ratio of 1/8/1 in the three-layer lamination of A/B/A, and the obtained molten laminated polymer was discharged from a T-die. This molten sheet was cooled for solidification in close contact on a casting drum held at 30° C. by electrostatic application to obtain an unstretched sheet. Next, this unstretched sheet was gradually preheated to 143° C. by a plurality of roll groups, passed between rolls having a circumferential speed difference while being maintained at a temperature of 143° C., and stretched 6.0 times in the longitudinal direction. Subsequently, the obtained uniaxially oriented film was guided to a tenter, stretched 10 times in the width direction at 163° C., then heat-treated at 130° C. while being relaxed by 10% in the width direction as the first-step heat treatment and the relaxation treatment, and further heat-treated at 140° C. while being held at a position in the width direction with clips as the second-step heat treatment. Thereafter, the heat-treated film through a cooling step at 100° C. was guided to the outside of the tenter, the clips at the ends of the film were released, and the film surface (surface side in contact with the casting drum) was subjected to the corona discharge treatment at a treatment intensity of 25 W-min/m$^2$ in a mixed gas atmosphere of carbon dioxide gas and nitrogen gas adjusted to have a carbon dioxide gas concentration ratio of 15 vol %. Thereafter, the obtained biaxially oriented polypropylene film was wound up as a film roll. The characteristics of the obtained polypropylene film are shown in Table 2. Conveyance wrinkles were generated in the polypropylene film at the time of Al vapor deposition, making it impossible to perform the subsequent barrier property evaluation.

Comparative Example 2

As the raw material for the A layer, A10 was used. In addition, as the raw material for the B layer, a mixture obtained by dry-blending B5 and M2 at 80:20 (mass ratio) was used. These materials were individually supplied to separate single-screw extruders, melt-extruded at 240° C., and foreign matters were removed with an 80 μm cut sintered filter. After that, the extrusion amount was adjusted with a feedblock so as to obtain a lamination thickness ratio of 1/8/1 in the three-layer lamination of A/B/A, and the obtained molten laminated polymer was discharged from a T-die. This molten sheet was cooled for solidification in close contact with a casting drum held at 20° C. by an air knife to obtain an unstretched sheet. Next, this unstretched film was preheated to 145° C. stepwise by a plurality of roll groups, passed between rolls having a circumferential speed difference as it was, and stretched 5.0 times in the longitudinal direction. Subsequently, the obtained uniaxially oriented film was guided to a tenter, and stretched 10 times in the width direction at 150° C. with the opposite ends in the width direction being grasped with clips. Furthermore, the film was heat-treated at 150° C. while being relaxed by 10% in the width direction as the relaxation treatment. Thereafter, the film was guided to the outside of the tenter, and the clips at the ends in the width direction were released. Subsequently, the film surface (surface side in contact with the casting drum) was subjected to the corona discharge treatment at a treatment intensity of 25 W-min/m² in a mixed gas atmosphere of carbon dioxide gas and nitrogen gas adjusted to have a carbon dioxide gas concentration ratio of 15 vol %. The biaxially oriented polypropylene film thus obtained was wound up as a film roll. The characteristics of the obtained biaxially oriented polypropylene film are shown in Table 2.

Comparative Examples 3 to 10

The biaxially oriented polypropylene film was produced in the same manner as in Example 1 except that the film formation conditions and the raw materials for the respective layers were changed as shown in Table 2. The characteristics of the obtained biaxially oriented polypropylene film are shown in Table 2.

Comparative Example 11

The biaxially oriented polypropylene film was produced in the same manner as in Example 7 except that the film formation conditions and the raw materials for the respective layers were changed as shown in Table 2. The characteristics of the obtained biaxially oriented polypropylene film are shown in Table 2.

TABLE 1-1-1

| | | | Example 1 | Example 2 | Example 3 | Example 4 |
|---|---|---|---|---|---|---|
| Raw materials and film formation conditions | Configuration | — | A/B/A | A/B/A | A/B/A | A/B/A |
| | Lamination ratio | — | 1/13/1 | 1/13/1 | 1/13/1 | 1/13/1 |
| | Raw material of A layer | Mass ratio | A1/A2 = 70/30 | A1/A2 = 80/20 | A1 | A1 |
| | Raw material of B layer | Mass ratio | B1/M1 = 75/25 | B1/M1 = 75/25 | B1/M1 = 75/25 | B1/M1 = 75/25 |
| | Raw material of C layer | Mass ratio | — | — | — | — |
| | Degree of crystallinity of resin composition of A layer (DSC measurement) | (%) | 63.5 | 63.6 | 63.4 | 63.7 |
| | Degree of crystallinity of resin composition of B layer (DSC measurement) | (%) | 57.3 | 57.3 | 57.2 | 57.4 |
| | Casting drum temperature | (°C.) | 20 | 18 | 22 | 90 |
| | Stretching temperature of longitudinal stretching | (°C.) | 105 | 105 | 105 | 105 |
| | Stretching ratio of longitudinal stretching | (Times) | 5.0 | 5.0 | 5.0 | 5.0 |
| | Heat treatment temperature | (°C.) | 165 | 159 | 153 | 163 |
| | Relaxation ratio | (%) | 12 | 10 | 10 | 10 |
| Film characteristics | Fraction of propylene unit in A layer | (mol %) | 99.5 or more | 99.5 or more | 99.5 or more | 99.5 or more |
| | Fraction of propylene unit in B layer | (mol %) | 92.4 | 92.4 | 92.4 | 92.4 |
| | Fraction of propylene unit in entire film | (mol %) | 93.3 | 93.3 | 93.3 | 93.3 |
| | Half bandwidth around 400 cm⁻¹ of a-surface (Raman measurement) | (cm⁻¹) | 5.34 | 5.42 | 5.50 | 5.50 |
| | Sharpness Sku of a-surface | (—) | 2.9 | 3.4 | 3.3 | 53 |
| | F5 value in direction perpendicular to principal orientation axis of film | (MPa) | 43 | 43 | 45 | 42 |
| | Film thickness | (μm) | 15.0 | 15.2 | 15.3 | 24.8 |
| | Strength X | (N/m) | 645 | 654 | 689 | 1042 |
| | $|S_{MD,\ 100°\ C.} - S_{MD,\ 130°\ C.}|$ | (%) | 0.48 | 1.19 | 1.72 | 0.53 |
| | $|S_{TD,\ 100°\ C.} - S_{TD,\ 130°\ C.}|$ | (%) | 1.01 | 1.77 | 2.15 | 1.14 |
| | Sa value of a-surface | (nm) | 21 | 23 | 24 | 55 |
| | Mz/Mn of propylene-based resin constituting A layer | (—) | 31 | 33 | 35 | 35 |
| | Differential distribution value when logarithmic molecular weight Log (M) of polypropylene-based resin contained in B layer is 6.5 | (%) | 7.1 | 7.1 | 7.1 | 7.1 |
| | Water vapor transmission rate after Al vapor deposition | — | A | B | C | C |
| | Oxygen transmission rate after Al vapor deposition | — | A | B | C | C |
| | Water vapor transmission rate after AlOx vapor deposition | — | — | — | — | — |
| | Oxygen transmission rate after AlOx vapor deposition | — | — | — | — | — |
| | Heat sealability | — | None | None | None | None |
| | Barrier stability | — | B | B | B | B |
| | Handleability | — | C | C | C | C |

TABLE 1-1-2

|  |  |  | Example 5 | Example 6 | Example 7 | Example 8 |
|---|---|---|---|---|---|---|
| Raw materials and film formation conditions | Configuration | — | A/B/A | A/B/A | A/B/C | Single layer |
|  | Lamination ratio | — | 1/13/1 | 2/11/2 | 1/13/1 |  |
|  | Raw material of A layer | Mass ratio | A3/A2 = 90/10 | A4 | A1/A2 = 70/30 | A3/A2 = 70/30 |
|  | Raw material of B layer | Mass ratio | B1/B2 = 50/50 | B3/M1 = 75/25 | B1/M1 = 75/25 | — |
|  | Raw material of C layer | Mass ratio | — | — | C1 |  |
|  | Degree of crystallinity of resin composition of A layer (DSC measurement) | (%) | 62.0 | 61.0 | 63.6 | 61.9 |
|  | Degree of crystallinity of resin composition of B layer (DSC measurement) | (%) | 58.1 | 55.4 | 57.3 | — |
|  | Casting drum temperature | (°C.) | 21 | 19 | 20 | 22 |
|  | Stretching temperature of longitudinal stretching | (°C.) | 140 | 105 | 105 | 105 |
|  | Stretching ratio of longitudinal stretching | (Times) | 5.0 | 5.0 | 5.0 | 5.0 |
|  | Heat treatment temperature | (°C.) | 164 | 167 | 165 | 166 |
|  | Relaxation ratio | (%) | 10 | 10 | 12 | 10 |
| Film characteristics | Fraction of propylene unit in A layer | (mol %) | 99.5 or more | 99.5 or more | 99.5 or more | 99.5 or more |
|  | Fraction of propylene unit in B layer | (mol %) | 98.5 | 92.4 | 92.4 | — |
|  | Fraction of propylene unit in entire film | (mol %) | 98.7 | 94.4 | 93.3 | — |
|  | Half bandwidth around 400 $cm^{-1}$ of a-surface (Raman measurement) | ($cm^{-1}$) | 7.05 | 7.50 | 5.34 | 7.10 |
|  | Sharpness Sku of a-surface | (—) | 3.1 | 2.8 | 2.9 | 4.0 |
|  | F5 value in direction perpendicular to principal orientation axis of film | (MPa) | 47 | 32 | 44 | 47 |
|  | Film thickness | (μm) | 15.2 | 15.1 | 15.2 | 15.1 |
|  | Strength X | (N/m) | 714 | 483 | 669 | 710 |
|  | $|S_{MD, 100°\,C.} - S_{MD, 130°\,C.}|$ | (%) | 1.53 | 1.20 | 0.46 | 1.61 |
|  | $|S_{TD, 100°\,C.} - S_{TD, 130°\,C.}|$ | (%) | 2.06 | 1.60 | 1.02 | 2.09 |
|  | Sa value of a-surface | (nm) | 22 | 20 | 21 | 25 |
|  | Mz/Mn of propylene-based resin constituting A layer | (—) | 18 | 37 | 31 | 21 |
|  | Differential distribution value when logarithmic molecular weight Log (M) of polypropylene-based resin contained in B layer is 6.5 | (%) | 8.2 | 9.7 | 7.1 | — |
|  | Water vapor transmission rate after Al vapor deposition | — | C | — | — | — |
|  | Oxygen transmission rate after Al vapor deposition | — | B | — | — | — |
|  | Water vapor transmission rate after AlOx vapor deposition | — | — | C | A | B |
|  | Oxygen transmission rate after AlOx vapor deposition | — | — | C | A | B |
|  | Heat sealability | — | None | None | Yes | None |
|  | Barrier stability | — | B | B | B | B |
|  | Handleability | — | C | C | C | C |

TABLE 1-2-1

|  |  |  | Example 9 | Example 10 | Example 11 | Example 12 | Example 13 |
|---|---|---|---|---|---|---|---|
| Raw materials and film formation conditions | Configuration | — | A/B/A | A/B/A | A/B/A | A/B/A | A/B/A |
|  | Lamination ratio | — | 1/13/1 | 1/13/1 | 1/13/1 | 1/13/1 | 1/13/1 |
|  | Raw material of A layer | Mass ratio | A1/P1 = 99.85/0.15 | A5/A2 = 90/10 | A1/A6 = 80/20 | A1/P2 = 99.9/0.1 | A1/A2 = 80/20 |
|  | Raw material of B layer | Mass ratio | B1/M1 = 75/25 | B1/B2 = 50/50 | B1/M1 = 75/25 | B1/M1 = 75/25 | B1/B2 = 50/50 |
|  | Raw material of C layer | Mass ratio | — | — | — | — | — |
|  | Degree of crystallinity of resin composition of A layer (DSC measurement) | (%) | 62.0 | 51.5 | 61.8 | 62.0 | 63.6 |
|  | Degree of crystallinity of resin composition of B layer (DSC measurement) | (%) | 57.2 | 57.9 | 57.4 | 57.2 | 57.9 |
|  | Casting drum temperature | (°C.) | 20 | 20 | 21 | 20 | 20 |
|  | Stretching temperature of longitudinal stretching | (°C.) | 105 | 105 | 105 | 105 | 105 |

TABLE 1-2-1-continued

|  |  |  | Example 9 | Example 10 | Example 11 | Example 12 | Example 13 |
|---|---|---|---|---|---|---|---|
| Film characteristics | Stretching ratio of longitudinal stretching | (Times) | 5.0 | 5.0 | 5.0 | 5.0 | 5.0 |
| | Heat treatment temperature | (° C.) | 155 | 165 | 166 | 155 | 165 |
| | Relaxation ratio | (%) | 10 | 10 | 10 | 10 | 10 |
| | Fraction of propylene unit in A layer | (mol %) | 99.5 or more | 96.0 | 95.5 | 99.5 or more | 99.5 or more |
| | Fraction of propylene unit in B layer | (mol %) | 92.3 | 98.5 | 92.4 | 92.3 | 98.5 |
| | Fraction of propylene unit in entire film | (mol %) | 93.3 | 98.2 | 92.8 | 93.3 | 98.2 |
| | Half bandwidth around 400 $cm^{-1}$ of a-surface (Raman measurement) | ($cm^{-1}$) | 5.75 | 8.95 | 7.15 | 5.77 | 5.42 |
| | Sharpness Sku of a-surface | (—) | 320 | 4.2 | 3.5 | 110 | 3.3 |
| | F5 value in direction perpendicular to principal orientation axis of film | (MPa) | 38 | 47 | 40 | 40 | 47 |
| | Film thickness | (μm) | 15.1 | 15.5 | 15.2 | 15.1 | 15.5 |
| | Strength X | (N/m) | 574 | 729 | 608 | 604 | 729 |
| | $\|S_{MD, 100° C.} - S_{MD, 130° C.}\|$ | (%) | 1.35 | 1.57 | 0.64 | 1.42 | 1.60 |
| | $\|S_{TD, 100° C.} - S_{TD, 130° C.}\|$ | (%) | 1.88 | 2.08 | 1.19 | 1.84 | 2.12 |
| | Sa value of a-surface | (nm) | 43 | 30 | 25 | 39 | 24 |
| | Mz/Mn of propylene-based resin constituting A layer | (—) | 35 | 32 | 34 | 35 | 32 |
| | Differential distribution value when logarithmic molecular weight Log (M) of polypropylene-based resin contained in B layer is 6.5 | (%) | 7.1 | 8.2 | 7.1 | 7.1 | 8.2 |
| | Water vapor transmission rate after Al vapor deposition | | — | — | — | — | — |
| | Oxygen transmission rate after Al vapor deposition | | — | — | — | — | — |
| | Water vapor transmission rate after AlOx vapor deposition | | — | C | C | B | B | B |
| | Oxygen transmission rate after AlOx vapor deposition | | — | C | C | B | B | B |
| | Heat sealability | | — | None | None | None | None | None |
| | Barrier stability | | — | C | B | B | C | B |
| | Handleability | | — | A | C | C | A | C |

TABLE 1-2-2

|  |  |  | Example 14 | Example 15 | Example 16 | Example 17 | Example 18 |
|---|---|---|---|---|---|---|---|
| Raw materials and film formation conditions | Configuration | — | A/B/C | A/B/C | A/B/A | A/B/C | A/B/C |
| | Lamination ratio | — | 1/13/1 | 1/13/1 | 1/13/1 | 1/13/1 | 1/13/1 |
| | Raw material of A layer | Mass ratio | A7/A2 = 80/20 | A8/A2/M4 = 76/20/4 | A1/A2/M4 = 76/20/4 | A1/A2/M4 = 76/20/4 | A9 |
| | Raw material of B layer | Mass ratio | B1/B6/M1 = 65/10/25 | B1/B6/M1 = 50/25/25 | B1/B6/M1 = 50/25/25 | B1/B6/M1 = 50/25/25 | B7/B6/M1 = 65/10/25 |
| | Raw material of C layer | Mass ratio | C2 | C2/M4 = 96/4 | — | C1/M4 = 96/4 | C2/P1 = 99/1 |
| | Degree of crystallinity of resin composition of A layer (DSC measurement) | (%) | 57.7 | 55.0 | 63.5 | 55.0 | 63.3 |
| | Degree of crystallinity of resin composition of B layer (DSC measurement) | (%) | 53.9 | 53.9 | 53.9 | 53.9 | 53.9 |
| | Casting drum temperature | (° C.) | 19 | 21 | 21 | 19 | 20 |
| | Stretching temperature of longitudinal stretching | (° C.) | 120 | 130 | 110 | 108 | 90 |
| | Stretching ratio of longitudinal stretching | (Times) | 4.8 | 4.3 | 5.2 | 5.0 | 3.8 |
| | Heat treatment temperature | | 168 | 169 | 169 | 167 | 167 |
| | Relaxation ratio | (%) | 5 | 10 | 12 | 12 | 12 |
| Film characteristics | Fraction of propylene unit in A layer | (mol %) | 99.0 | 98.0 | 98.0 | 98.0 | 99.5 or more |
| | Fraction of propylene unit in B layer | (mol %) | 92.4 | 92.4 | 92.4 | 92.4 | 92.4 |
| | Fraction of propylene unit in entire film | (mol %) | 93.1 | 92.9 | 92.9 | 92.8 | 93.3 |
| | Half bandwidth around 400 $cm^{-1}$ of a-surface (Raman measurement) | ($cm^{-1}$) | 7.80 | 8.10 | 5.37 | 5.40 | 5.79 |
| | Sharpness Sku of a-surface | (—) | 3.0 | 7.5 | 6.9 | 3.0 | 3.2 |
| | F5 value in direction perpendicular to principal orientation axis of film | (MPa) | 43 | 33 | 43 | 43 | 30 |
| | Film thickness | (μm) | 12.0 | 17.0 | 17.0 | 15.0 | 14.8 |
| | Strength X | (N/m) | 516 | 561 | 731 | 645 | 444 |

TABLE 1-2-2-continued

|  |  | Example 14 | Example 15 | Example 16 | Example 17 | Example 18 |
|---|---|---|---|---|---|---|
| $|S_{MD, 100° C.} - S_{MD, 130° C.}|$ | (%) | 0.55 | 0.60 | 0.57 | 0.48 | 1.88 |
| $|S_{TD, 100° C.} - S_{TD, 130° C.}|$ | (%) | 2.23 | 1.25 | 1.22 | 1.23 | 1.60 |
| Sa value of a-surface | (nm) | 18 | 20 | 20 | 17 | 21 |
| Mz/Mn of propylene-based resin constituting A layer | (—) | 25 | 30 | 32 | 30 | 37 |
| Differential distribution value when logarithmic molecular weight Log (M) of polypropylene-based resin contained in B layer is 6.5 | (%) | 6.3 | 4.1 | 4.1 | 4.1 | 11.5 |
| Water vapor transmission rate after Al vapor deposition |  | — | — | — | — | — |
| Oxygen transmission rate after Al vapor deposition |  | — | — | — | — | — |
| Water vapor transmission rate after AlOx vapor deposition |  | — | B | B | A | A | C |
| Oxygen transmission rate after AlOx vapor deposition |  | — | B | B | A | A | C |
| Heat sealability |  | — | None | None | None | Yes | None |
| Barrier stability |  | — | B | A | A | A | D |
| Handleability |  | — | C | A | A | A | B |

TABLE 2-1

|  |  |  | Comparative Example 1 | Comparative Example 2 | Comparative Example 3 | Comparative Example 4 |
|---|---|---|---|---|---|---|
| Raw materials and film formation conditions | Configuration | — | A/B/A | A/B/A | A/B/A | A/B/A |
|  | Lamination ratio | — | 1/8/1 | 1/8/1 | 1/13/1 | 1/13/1 |
|  | Raw material of A layer | Mass ratio | A9/P2 = 99.9/0.1 | A10 | A1 | A11 |
|  | Raw material of B layer | Mass ratio | B4/R1 = 99.7/0.3 | B5/M2 = 80/20 | B1/M1 = 75/25 | B1/M1 = 75/25 |
|  | Raw material of C layer | Mass ratio | — | — | — | — |
|  | Degree of crystallinity of resin composition of A layer (DSC measurement) | (%) | 63.3 | 60.4 | 63.5 | 54.0 |
|  | Degree of crystallinity of resin composition of B layer (DSC measurement) | (%) | 63.3 | 56.5 | 57.3 | 57.3 |
|  | Casting drum temperature | (° C.) | 30 | 20 | 18 | 21 |
|  | Stretching temperature of longitudinal stretching | (° C.) | 143 | 145 | 140 | 120 |
|  | Stretching ratio of longitudinal stretching | (Times) | 6.0 | 5.0 | 4.0 | 5.0 |
|  | Heat treatment temperature | (° C.) | 130/140 | 150 | 166 | 158 |
|  | Relaxation ratio | (%) | 10 | 10 | 10 | 5 |
| Film characteristics | Fraction of propylene unit in A layer | (mol %) | 99.5 or more | 99.5 or more | 99.5 or more | 96.5 |
|  | Fraction of propylene unit in B layer | (mol %) | 99.2 | 89.8 | 92.4 | 92.4 |
|  | Fraction of propylene unit in entire film | (mol %) | 99.3 | 91.7 | 93.3 | 92.9 |
|  | Half bandwidth around 400 cm$^{-1}$ of a-surface (Raman measurement) | (cm$^{-1}$) | 5.79 | 8.33 | 5.34 | 8.80 |
|  | Sharpness Sku of a-surface | (—) | 110 | 3.1 | 5.5 | 3.1 |
|  | F5 value in direction perpendicular to principal orientation axis of film | (MPa) | 43 | 29 | 26 | 42 |
|  | Film thickness | (μm) | 2.0 | 20.0 | 15.0 | 15.0 |
|  | Strength X | (N/m) | 86 | 580 | 390 | 630 |
|  | $|S_{MD, 100° C.} - S_{MD, 130° C.}|$ | (%) | 1.60 | 2.20 | 0.75 | 1.55 |
|  | $|S_{TD, 100° C.} - S_{TD, 130° C.}|$ | (%) | 2.22 | 2.95 | 1.13 | 2.57 |
|  | Sa value of a-surface | (nm) | 39 | 22 | 37 | 23 |
|  | Mz/Mn of propylene-based resin constituting A layer | (—) | 37 | 40 | 35 | 34 |
|  | Differential distribution value when logarithmic molecular weight Log (M) of polypropylene-based resin contained in B layer is 6.5 | (%) | 9.3 | 8.9 | 7.1 | 7.1 |
|  | Water vapor transmission rate after Al vapor deposition |  | — | (Conveyance wrinkles) | — | — | — |
|  | Oxygen transmission rate after Al vapor deposition |  | — | (Conveyance wrinkles) | — | — | — |
|  | Water vapor transmission rate after AlOx vapor deposition |  | — | — | D | D | D |

TABLE 2-1-continued

|  |  |  | Comparative Example 1 | Comparative Example 2 | Comparative Example 3 | Comparative Example 4 |
|---|---|---|---|---|---|---|
| | Oxygen transmission rate after AlOx vapor deposition | | — | — | D | D | D |
| | Heat sealability | | — | None | None | None | None |
| | Barrier stability | | — | C | B | B | B |
| | Handleability | | — | A | D | C | C |

TABLE 2-2

|  |  |  | Comparative Example 5 | Comparative Example 6 | Comparative Example 7 | Comparative Example 8 |
|---|---|---|---|---|---|---|
| Raw materials and film formation conditions | Configuration | — | A/B/A | A/B/A | A/B/A | A/B/A |
| | Lamination ratio | — | 1/13/1 | 1/13/1 | 1/13/1 | 1/13/1 |
| | Raw material of A layer | Mass ratio | A11 | A1 | A1 | A10 |
| | Raw material of B layer | Mass ratio | B3 | B7/M1 = 75/25 | B3 | B8/M1 = 75/25 |
| | Raw material of C layer | Mass ratio | — | — | — | — |
| | Degree of crystallinity of resin composition of A layer (DSC measurement) | (%) | 54.0 | 63.5 | 63.5 | 60.4 |
| | Degree of crystallinity of resin composition of B layer (DSC measurement) | (%) | 60.4 | 60.5 | 60.4 | 50.9 |
| | Casting drum temperature | (° C.) | 20 | 21 | 21 | 19 |
| | Stretching temperature of longitudinal stretching | (° C.) | 120 | 118 | 117 | 120 |
| | Stretching ratio of longitudinal stretching | (Times) | 5.0 | 5.0 | 5.0 | 5.0 |
| | Heat treatment temperature | (° C.) | 150 | 157 | 158 | 156 |
| | Relaxation ratio | (%) | 10 | 10 | 0 | 10 |
| Film Characteristics | Fraction of propylene unit in A layer | (mol %) | 96.5 | 99.5 or more | 99.5 or more | 99.5 or more |
| | Fraction of propylene unit in B layer | (mol %) | 99.5 or more | 92.4 | 99.5 or more | 99.5 or more |
| | Fraction of propylene unit in entire film | (mol %) | 99.5 or more | 93.3 | 99.5 or more | 99.5 or more |
| | Half bandwidth around 400 cm$^{-1}$ of a-surface (Raman measurement) | (cm$^{-1}$) | 8.80 | 5.34 | 7.47 | 8.35 |
| | Sharpness Sku of a-surface | (—) | 3.2 | 3.1 | 3.3 | 3.2 |
| | F5 value in direction perpendicular to principal orientation axis of film | (MPa) | 43 | 42 | 43 | 42 |
| | Film thickness | (μm) | 15.0 | 14.8 | 15.2 | 15.0 |
| | Strength X | (N/m) | 645 | 622 | 654 | 630 |
| | $\|S_{MD, 100° C.} - S_{MD, 130° C.}\|$ | (%) | 2.25 | 2.12 | 1.89 | 2.17 |
| | $\|S_{TD, 100° C.} - S_{TD, 130° C.}\|$ | (%) | 2.73 | 2.46 | 3.72 | 2.55 |
| | Sa value of a-surface | (nm) | 22 | 21 | 22 | 23 |
| | Mz/Mn of propylene-based resin constituting A layer | (—) | 34 | 35 | 35 | 40 |
| | Differential distribution value when logarithmic molecular weight Log (M) of polypropylene-based resin contained in B layer is 6.5 | (%) | 9.7 | 12.0 | 9.7 | 8.4 |
| | Water vapor transmission rate after Al vapor deposition | | — | — | — | — |
| | Oxygen transmission rate after Al vapor deposition | | — | — | — | — |
| | Water vapor transmission rate after AlOx vapor deposition | | — | D | D | D | D |
| | Oxygen transmission rate after AlOx vapor deposition | | — | D | D | D | D |
| | Heat sealability | | — | None | None | None | None |
| | Barrier stability | | — | B | B | B | B |
| | Handleability | | — | C | C | C | D |

TABLE 2-3

| | | | Comparative Example 9 | Comparative Example 10 | Comparative Example 11 |
|---|---|---|---|---|---|
| Raw materials and film formation conditions | Configuration | — | A/B/A | A/B/A | A/B/C |
| | Lamination ratio | — | 1/13/1 | 1/8/1 | 1/13/1 |
| | Raw material of A layer | Mass ratio | A10 | A10/P1 = 99.85/0.15 | A4 |
| | Raw material of B layer | Mass ratio | B5 | B1/M3 = 75/25 | B3 |
| | Raw material of C layer | Mass ratio | — | — | C2/P1 = 99/1 |
| | Degree of crystallinity of resin composition of A layer (DSC measurement) | (%) | 60.4 | 60.4 | 60.9 |
| | Degree of crystallinity of resin composition of B layer (DSC measurement) | (%) | 62.5 | 57.2 | 60.4 |
| | Casting drum temperature | (° C.) | 20 | 50 | 19 |
| | Stretching temperature of longitudinal stretching | (° C.) | 130 | 130 | 120 |
| | Stretching ratio of longitudinal stretching | (Times) | 5.0 | 4.3 | 3.7 |
| | Heat treatment temperature | (° C.) | 150 | 160 | 160 |
| | Relaxation ratio | (%) | 10 | 10 | 10 |
| Film characteristics | Fraction of propylene unit in A layer | (mol %) | 99.5 or more | 99.5 or more | 99.5 or more |
| | Fraction of propylene unit in B layer | (mol %) | 99.5 or more | 92.3 | 99.5 or more |
| | Fraction of propylene unit in entire film | (mol %) | 99.5 or more | 93.3 | 99.5 or more |
| | Half bandwidth around 400 $cm^{-1}$ of a-surface (Raman measurement) | ($cm^{-1}$) | 8.31 | 8.36 | 7.49 |
| | Sharpness Sku of a-surface | (—) | 3.4 | 310 | 3.3 |
| | F5 value in direction perpendicular to principal orientation axis of film | (MPa) | 43 | 34 | 28 |
| | Film thickness | (μm) | 15.0 | 20.0 | 12.0 |
| | Strength X | (N/m) | 645 | 680 | 336 |
| | $|S_{MD, 100° C.}-S_{MD, 130° C.}|$ | (%) | 2.20 | 2.31 | 1.58 |
| | $|S_{TD, 100° C.}-S_{TD, 130° C.}|$ | (%) | 2.66 | 2.41 | 2.24 |
| | Sa value of a-surface | (nm) | 23 | 42 | 22 |
| | Mz/Mn of propylene-based resin constituting A layer | (—) | 40 | 40 | 37 |
| | Differential distribution value when logarithmic molecular weight Log (M) of polypropylene-based resin contained in B layer is 6.5 | (%) | 8.9 | 7.1 | 9.7 |
| | Water vapor transmission rate after Al vapor deposition | — | — | — | — |
| | Oxygen transmission rate after Al vapor deposition | — | — | — | — |
| | Water vapor transmission rate after AlOx vapor deposition | — | D | D | D |
| | Oxygen transmission rate after Alox vapor deposition | — | D | D | D |
| | Heat sealability | — | None | None | None |
| | Barrier stability | — | B | D | D |
| | Handleability | — | D | A | A |

For the vapor deposition, the Al vapor deposition was performed in Examples 1 to 5 and Comparative Example 1, and the AlOx vapor deposition was performed in Examples 6 to 18 and Comparative Examples 2 to 11. Strictly speaking, the A layer was not present in Example 8 because the single-layer polypropylene film was used, but the raw material was described using the film itself as the "A layer". In addition, in a case where the fraction of the propylene unit in the A layer was 99.5% or more at the time of calculating the fraction of the propylene unit in the entire film, the fraction was calculated as 100% for convenience.

According to embodiments of the present invention, it is possible to obtain a polypropylene film that is excellent in stability to heat during vapor deposition and heat sterilization treatment, and has a favorable water vapor barrier property and oxygen barrier property particularly when a transparent vapor-deposited layer is laminated. Since the polypropylene film according to embodiments of the present invention is excellent in the above-mentioned characteristics, the polypropylene film can be suitably used in packaging applications.

The invention claimed is:
1. A polypropylene film comprising:
a polypropylene-based resin as a main component, in which a strength X value obtained by multiplying a film thickness by an F5 value in a direction perpendicular to a principal orientation axis is 400 N/m or more and 2000 N/m or less,
as measured by thermomechanical analysis (TMA), when: a thermal shrinkage percentage (%) at 100° C. in the direction perpendicular to the principal orientation axis is $S_{MD,100° C.}$; a thermal shrinkage percentage (%) at 130° C. in the direction perpendicular to the principal orientation axis is $S_{MD,130° C.}$; a thermal shrinkage percentage (%) at 100° C. in a direction of the principal orientation axis is $S_{TD,100° C.}$; and a thermal shrinkage percentage (%) at 130° C. in the direction of the principal orientation axis is $S_{TD,130° C.}$, the polypropylene film satisfies $|S_{MD,100° C.}-S_{MD,130° C.}|≤2.00$ and $|S_{TD,100° C.}-S_{TD,130° C.}|≤2.50$; and
wherein an a-surface of the polypropylene film having a relatively small sharpness Sku has a half bandwidth around 400 $cm^{-1}$ of 4.00 $cm^{-1}$ or more and 6.90 $cm^{-1}$ or less, as obtained by micro-Raman measurement.

2. The polypropylene film according to claim 1, wherein a sharpness Sku of at least one surface is 300 or less.

3. The polypropylene film according to claim 1, wherein surface has a surface roughness Sa value of 50 nm or less.

4. The polypropylene film according to claim 1, comprising at least two layers comprising an A layer and a B layer, each containing a polypropylene-based resin as a main component, wherein a fraction of a propylene unit in the A layer is 97.0 mol % or more and 100.0 mol % or less, and is larger than a fraction of a propylene unit in the entire polypropylene film.

5. The polypropylene film according to claim 4, wherein a degree of crystallinity of a resin composition of the A layer calculated from a fusion enthalpy ΔHm of a 2nd Run measured by differential scanning calorimetry (DSC) is higher than a degree of crystallinity of a resin composition of the B layer.

6. The polypropylene film according to claim 4, wherein a molecular weight distribution of the polypropylene-based resin contained in the A layer satisfies $15 \leq Mz/Mn \leq 36$.

7. The polypropylene film according to claim 4, wherein a differential distribution value when a logarithmic molecular weight Log (M) is 6.5 of the polypropylene-based resin contained in the B layer satisfies 1.0% or more and 10% or less.

8. The polypropylene film according to claim 4, wherein the A layer, the B layer, and the A layer are positioned in this order, and top layers on opposite sides are the A layers.

9. The polypropylene film according to claim 4, wherein the A layer, the B layer, and a C layer are positioned in this order, one top layer is the A layer, and the other top layer is the C layer.

10. The polypropylene film according to claim 9, wherein the A layer and/or the C layer contain(s) a thermoplastic resin that is incompatible with the polypropylene-based resin.

11. The polypropylene film according to claim 10, wherein the thermoplastic resin that is incompatible with the polypropylene-based resin is a polymethylpentene-based resin.

12. The polypropylene film according to claim 9, wherein the C layer is a heat seal layer.

13. The polypropylene film according to claim 4, wherein the B layer contains a petroleum resin.

14. A laminate comprising: the polypropylene film according to claim 1; and a D layer containing a metal and/or an inorganic compound in a total amount of more than 50% by mass and 100% by mass or less.

15. The laminate according to claim 14, wherein the D layer is laminated on an A layer including the a-surface.

16. A packaging material comprising at least one of the polypropylene film according to claim 1 and a laminate comprising: the polypropylene film; and a D layer containing a metal and/or an inorganic compound in a total amount of more than 50% by mass and 100% by mass or less.

17. A packing body comprising a content packed using the packaging material according to claim 16.

18. The packaging material according to claim 16, wherein the polypropylene film comprises at least two layers comprising an A layer and a B layer, each containing a polypropylene-based resin as a main component, wherein a fraction of a propylene unit in the A layer is 97.0 mol % or more and 100.0 mol % or less, and is larger than a fraction of a propylene unit in the entire polypropylene film.

19. The packaging material according to claim 18, wherein the D layer is laminated on the A layer including the a-surface.

* * * * *